US012719675B2

(12) United States Patent
Hill et al.

(10) Patent No.: US 12,719,675 B2
(45) Date of Patent: Aug. 25, 2026

(54) END-TO-END ENCRYPTION AND HOT WALLET KEY RECOVERY APPARATUSES, PROCESSES AND SYSTEMS

(71) Applicant: FMR LLC, Boston, MA (US)

(72) Inventors: David Lawrence Hill, North Smithfield, RI (US); Jason Thomas Ward, Bedford, NH (US); William Baxter, Boston, MA (US); Aaron Smith, Wargrave (GB)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/939,447

(22) Filed: Nov. 6, 2024

(65) Prior Publication Data

US 2025/0148456 A1 May 8, 2025

Related U.S. Application Data

(60) Provisional application No. 63/596,963, filed on Nov. 7, 2023.

(51) Int. Cl.
*H04L 9/08* (2006.01)
*G06F 21/00* (2013.01)
(Continued)

(52) U.S. Cl.
CPC ............ *H04L 9/0894* (2013.01); *G06F 21/00* (2013.01); *G06Q 20/3823* (2013.01);
(Continued)

(58) Field of Classification Search
CPC ........... G06Q 20/3823; G06Q 20/3674; G06Q 20/3829; G06Q 20/4012; G06F 21/00
(Continued)

(56) References Cited

U.S. PATENT DOCUMENTS 6,202,068 B1 3/2001 Kraay et al.
6,460,138 B1 * 10/2002 Morris ............. G06Q 20/40975 713/168

(Continued)

FOREIGN PATENT DOCUMENTS

CA 2870844 A1 5/2015
CA 2843034 A1 8/2015

(Continued)

OTHER PUBLICATIONS

Third party submission filed in related U.S. Appl. No. 14/799,242.

(Continued)

*Primary Examiner* — Wodajo Getachew
(74) *Attorney, Agent, or Firm* — Hanchuk Kheit LLP.; Walter G. Hanchuk

(57) ABSTRACT

The End-to-End Encryption and Hot Wallet Key Recovery Apparatuses, Processes and Systems ("E2EEHWKR") transforms key backup request, key recovery request datastructure/inputs via E2EEHWKR components into key backup response, key recovery response outputs. A key backup request datastructure specifying a wallet private key, a private key backup server identifier, a PIN shard fracture scheme definition, and a plurality of PIN shard backup devices is obtained. A user security PIN is obtained and utilized to encrypt the wallet private key. A symmetric key is calculated from a public key associated with the private key backup server identifier and an app private key. The encrypted wallet private key is encrypted utilizing the symmetric key. The twice encrypted wallet private key is sent to a private key backup server. The user security PIN is encrypted utilizing an asymmetric keypair. Encrypted user security PIN shards are generated and sent to PIN shard backup devices.

18 Claims, 9 Drawing Sheets

E2EEHWKR ARCHITECTURE

(51) Int. Cl.
*G06Q 20/36* (2012.01)
*G06Q 20/38* (2012.01)
*G06Q 20/40* (2012.01)
*H04L 9/00* (2022.01)

(52) U.S. Cl.
CPC ..... *G06Q 20/3829* (2013.01); *G06Q 20/4012* (2013.01); *H04L 9/0822* (2013.01); *H04L 9/0825* (2013.01); *H04L 9/085* (2013.01); *G06F 2221/2107* (2013.01); *G06Q 20/3674* (2013.01); *H04L 9/0897* (2013.01); *H04L 9/50* (2022.05)

(58) Field of Classification Search
USPC .................. 705/16, 21, 59, 67; 380/44, 262
See application file for complete search history.

(56) References Cited

U.S. PATENT DOCUMENTS 6,760,752 B1 * 7/2004 Liu .................... H04L 63/0435
6,957,339 B2 * 10/2005 Shinzaki ............. G06Q 20/341 713/184
8,848,053 B2 9/2014 Scanlon
9,076,290 B2 7/2015 Griffin
9,082,113 B2 7/2015 Shea et al.
9,087,326 B2 7/2015 Shea et al.
9,098,190 B2 8/2015 Zhou
9,098,387 B1 8/2015 Curtis et al.
9,098,874 B2 8/2015 Chandra et al.
9,117,341 B2 8/2015 Marantelli
9,122,749 B2 9/2015 Elmore et al.
9,129,338 B2 9/2015 Liu
9,129,339 B2 9/2015 Liu
9,135,616 B2 9/2015 Hirson et al.
9,135,787 B1 9/2015 Russell
9,144,742 B1 9/2015 Curtis et al.
9,153,088 B2 10/2015 Spencer, II
9,160,717 B2 10/2015 Bhanoo et al.
9,451,030 B2 9/2016 Schunder
2004/0098352 A1 * 5/2004 Matsuyama ......... G06Q 20/382 705/71
2004/0151317 A1 * 8/2004 Hyyppa ............. H04W 12/041 380/277
2007/0215695 A1 † 9/2007 Trane
2013/0318354 A1 * 11/2013 Entschew ............ H04L 9/3247 713/175
2015/0018084 A1 † 1/2015 Gatto et al.
2015/0262172 A1 9/2015 Rebernik
2015/0262173 A1 9/2015 Durbin et al.
2015/0262176 A1 9/2015 Langschaedel et al.
2015/0262251 A1 9/2015 Knobel
2015/0269538 A1 9/2015 Stanchfield
2015/0269539 A1 9/2015 MacGregor et al.
2015/0269541 A1 9/2015 MacGregor et al.
2015/0269570 A1 9/2015 Phan et al.
2015/0271183 A1 9/2015 MacGregor et al.
2015/0278820 A1 10/2015 Meadows
2015/0286995 A1 10/2015 Korosec
2015/0287026 A1 10/2015 Yang et al.
2015/0294308 A1 10/2015 Pauker et al.
2015/0294424 A1 10/2015 Hakim
2015/0294425 A1 10/2015 Benson
2015/0302357 A1 10/2015 Chandra
2015/0302400 A1 10/2015 Metral
2015/0302401 A1 10/2015 Metral
2015/0302441 A1 10/2015 Katsuyama et al.
2015/0302446 A1 10/2015 Park et al.
2016/0019522 A1 † 1/2016 Granbery et al.
2016/0073279 A1 3/2016 Johnsson
2016/0086175 A1 3/2016 Finlow-Bates
2016/0210632 A1 † 7/2016 Li
2020/0111080 A1 4/2020 Metcalfe
2020/0250163 A1 * 8/2020 Kuimelis ........... G06F 16/2272
2020/0286047 A1 9/2020 Joveski
2020/0304518 A1 9/2020 Thekadath

FOREIGN PATENT DOCUMENTS

CA 2845648 A1 9/2015
CN 101964039 A1 * 2/2011
CN 115002759 A1 * 9/2022
EP 2820797 A1 1/2015
EP 2831823 A1 2/2015
EP 2874112 A1 5/2015
EP 2896001 A1 7/2015
JP 2004102766 A1 * 4/2004
KR 20180046720 A1 * 5/2018
WO 2008065345 A1 6/2008
WO 2012142521 A2 10/2012
WO 2013078990 A1 6/2013
WO 2014201059 A1 12/2014
WO 2015004820 A1 1/2015
WO 2015016356 A1 2/2015
WO 2015024129 A1 2/2015
WO 2015051692 A1 4/2015
WO 2015058282 A1 4/2015
WO 2015059669 A1 5/2015
WO 2015077378 A1 6/2015
WO 2015085393 A1 6/2015
WO 2015095761 A1 7/2015
WO 2015106285 A1 8/2015
WO 2015113519 A1 8/2015
WO 2015120606 A1 8/2015
WO 2015116998 A2 9/2015
WO 2015134890 A1 9/2015
WO 2015135018 A1 9/2015
WO 2015142765 A1 9/2015
WO 2015143068 A1 9/2015
WO 2015144971 A1 10/2015
WO 2015148725 A2 10/2015
WO 2016025990 † 2/2016
WO 2019132646 7/2019

OTHER PUBLICATIONS

"Developer Guide -Bitcoin", Anonymous, May 11, 2015, pp1-48.
"On the Privacy Provisions of Bloom Filters in Lightweight Bitcoin Clients", Arthur Gervais et al., International Association For Cryptologic Research, vol. 20141013:202348, Oct. 2014, pp1-11.
"Making Sense of Data II, A practical Guide to Data Visualization, Advanced Data Mining Methods and Applications", Glenn Hyatt et al., download from http://www.safanbooksonline.com/library/view/making.sense-of/9780470222805/00 co, Oct. 28, 2018.
European Search Report, dated Feb. 13, 2019 for EP Application No. 16825146.0.
"Crytocurrencies, smart contracts, and artificial intelligence", Steve Omohundro, Dec. 19, 2014, AI Matters, ACM vol. 1, No. 2.
"Smart Oracles: A Simple, Powerful Approach to Smart Contracts? Codius/codius WiKi? GitHub", Jul. 17, 2014, https://github.com/codius/codius/wiki/Smart-Oracles:-A-Simple,-Powerful-Approach-to-Smart-Contracts.
"Distributed Consensus Technologies in Crytocurrency Applications", Francisco Rivera, Jul. 15, 2014.
"Blockchain Electronic Vote Contents", Pierre Noizat et al., Apr. 29, 2015.
Supplementary Search Report dated May 27, 2019 for EP Application No. 16825146.
International Search Report for PCT/US2016/042169 mailed Oct. 5, 2016.

* cited by examiner
† cited by third party

FIGURE 1: E2EEHWKR ARCHITECTURE
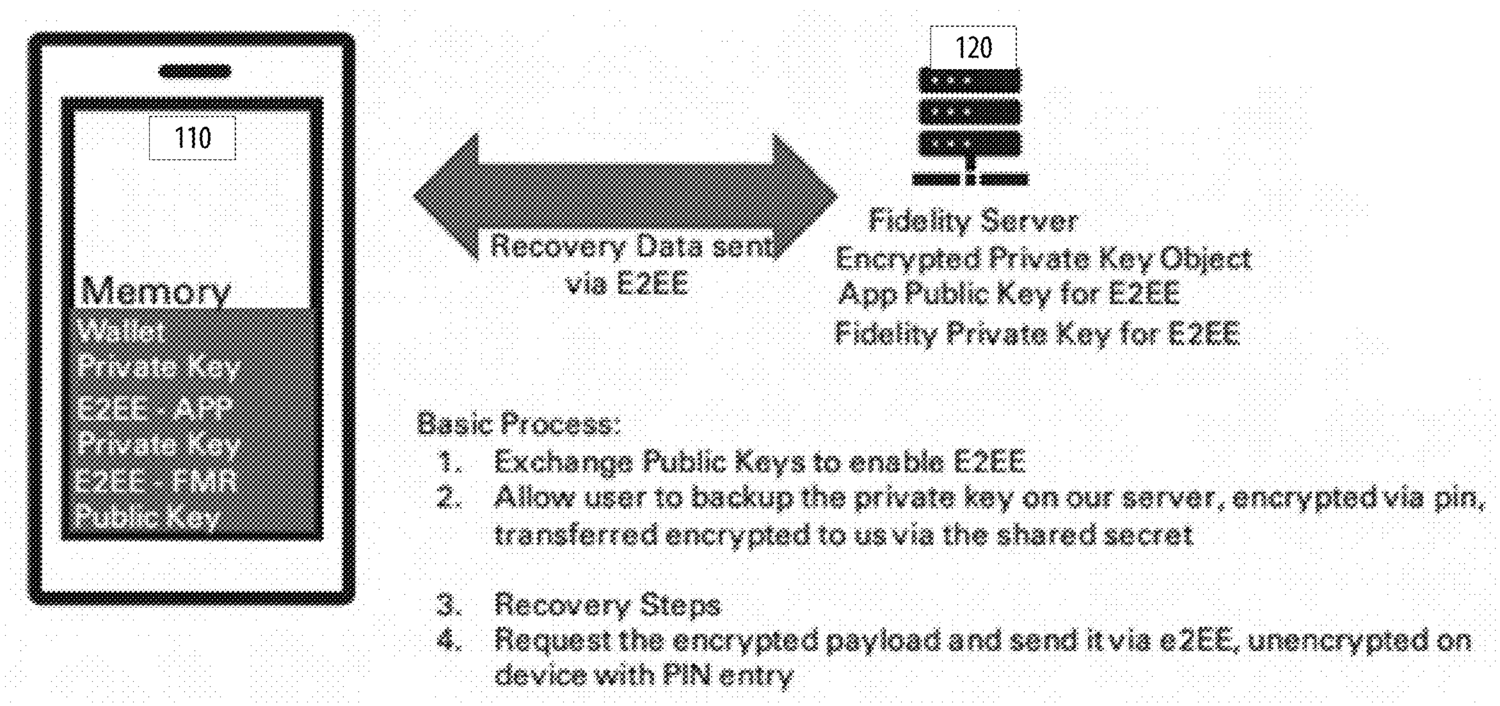

FIGURE 2: E2EEHWKR KEY BACKUP DATA FLOW
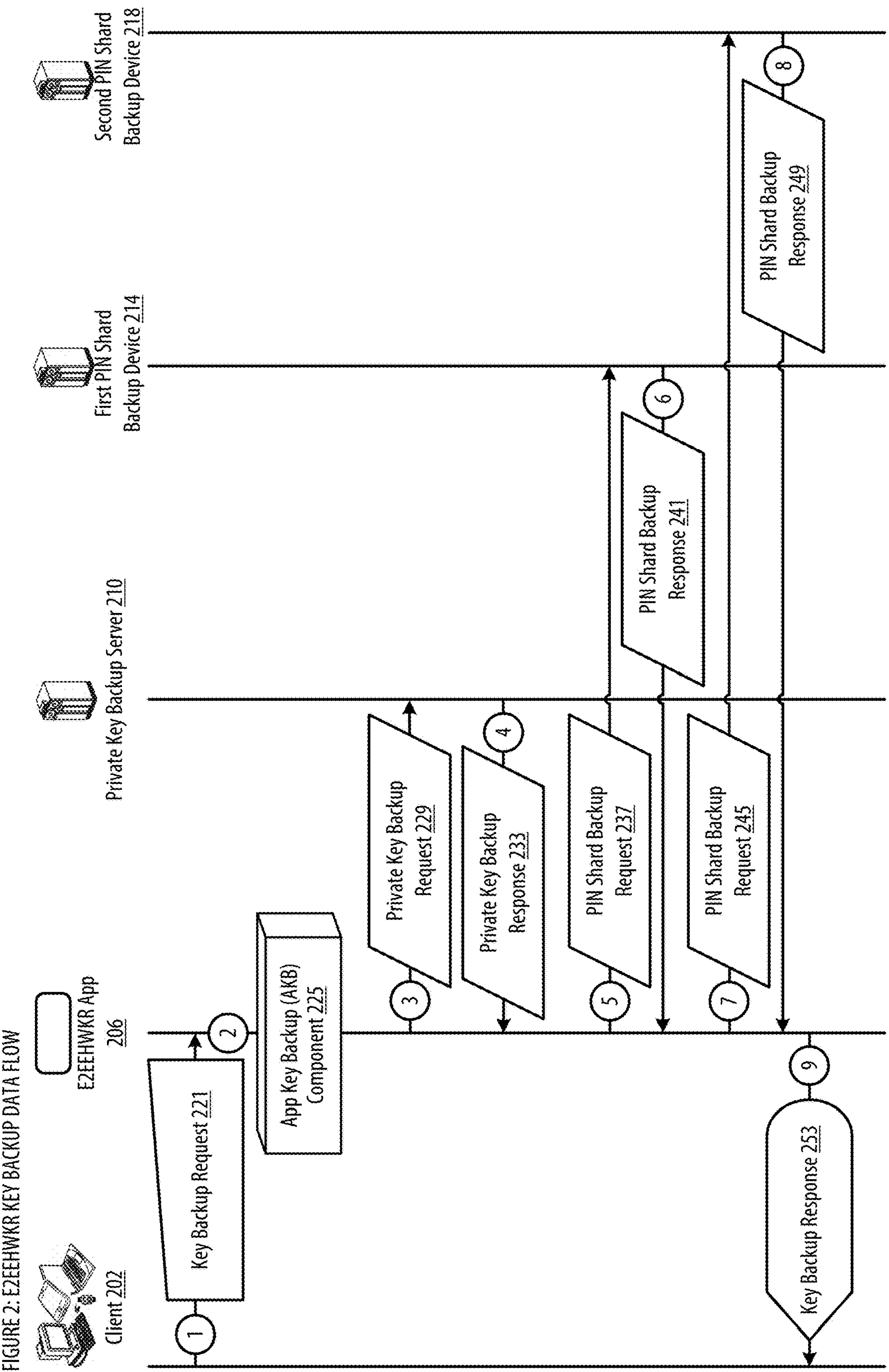

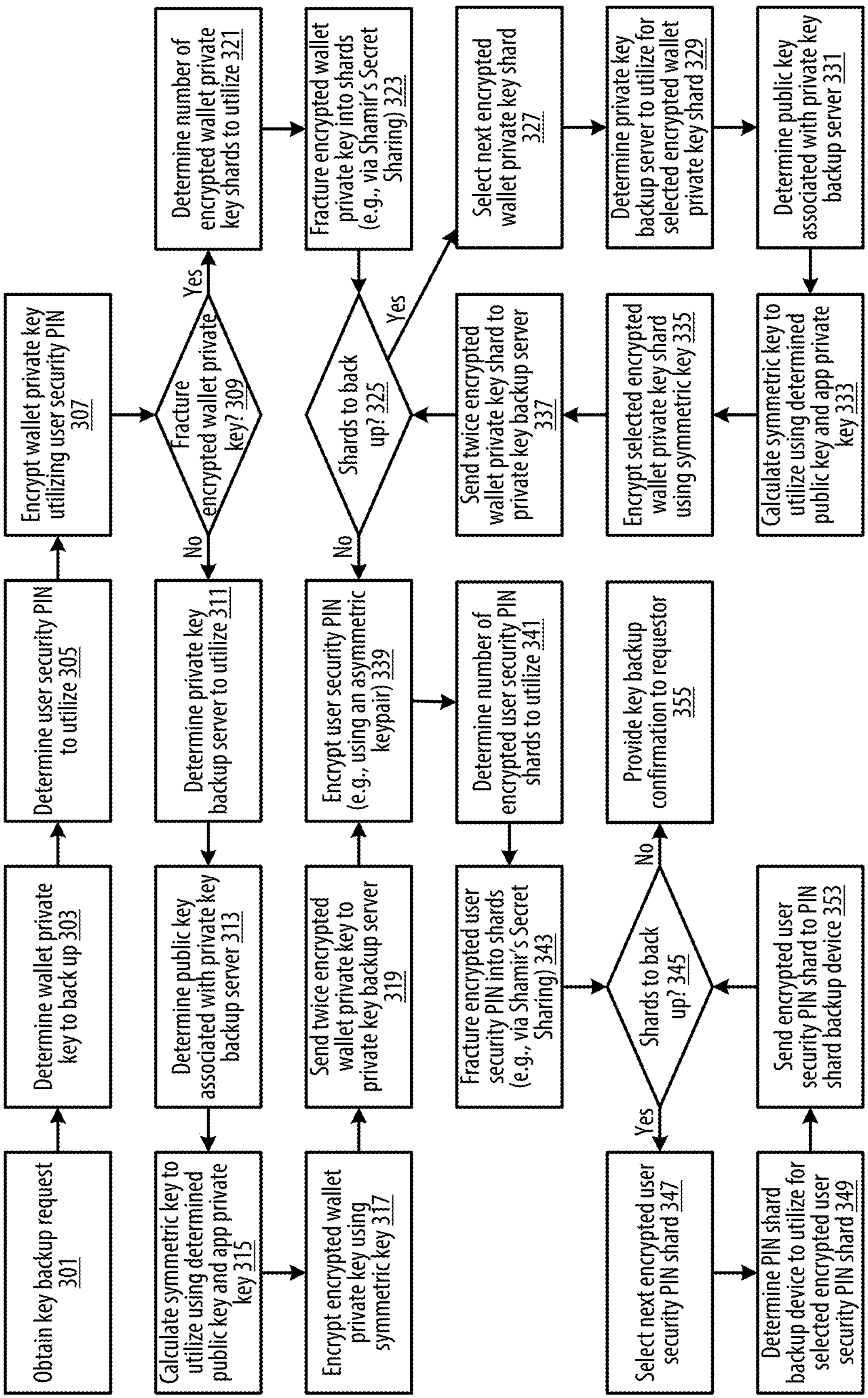
FIGURE 3: E2EEHWKR AKB COMPONENT

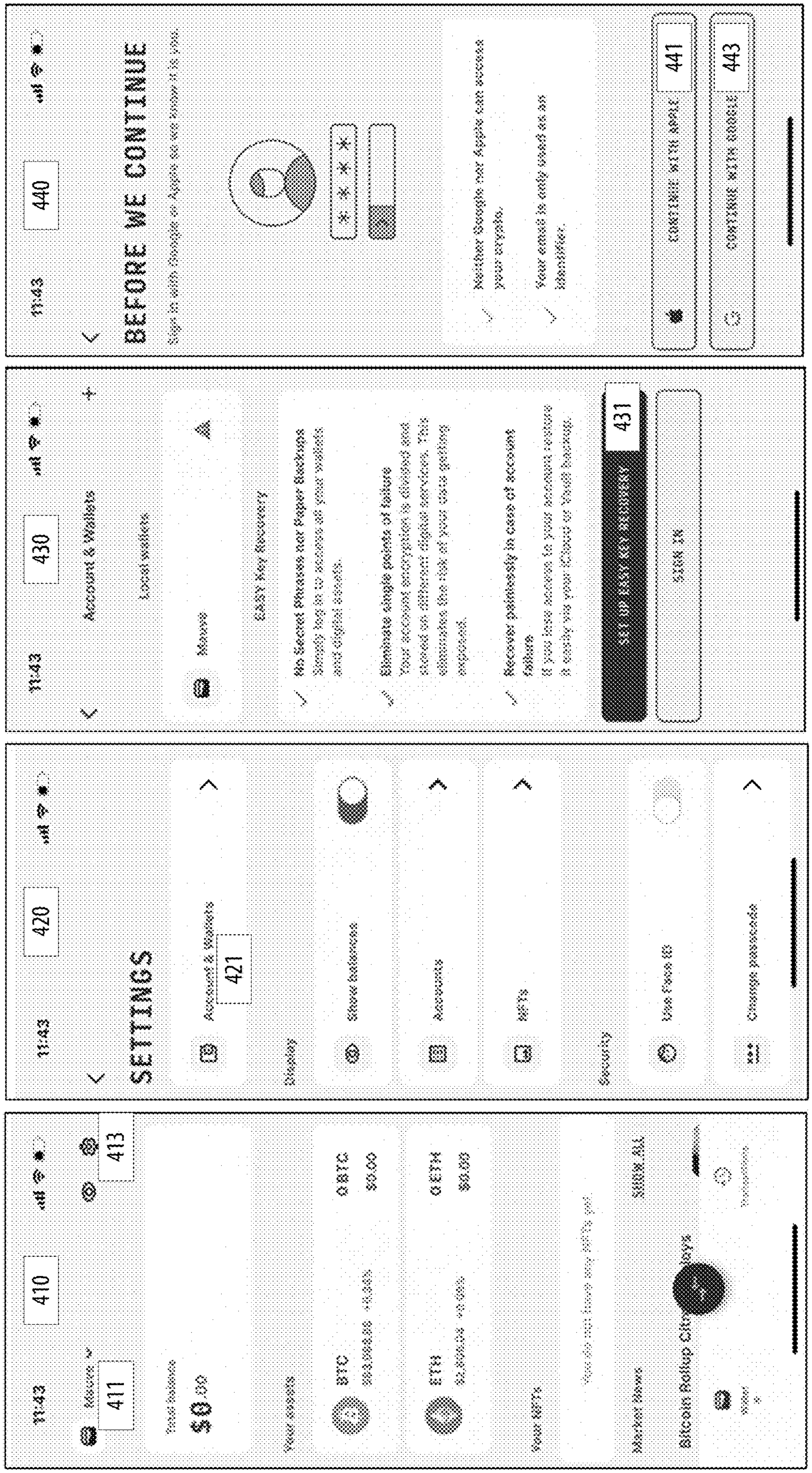
FIGURE 4A: E2EEHWKR SCREENSHOT

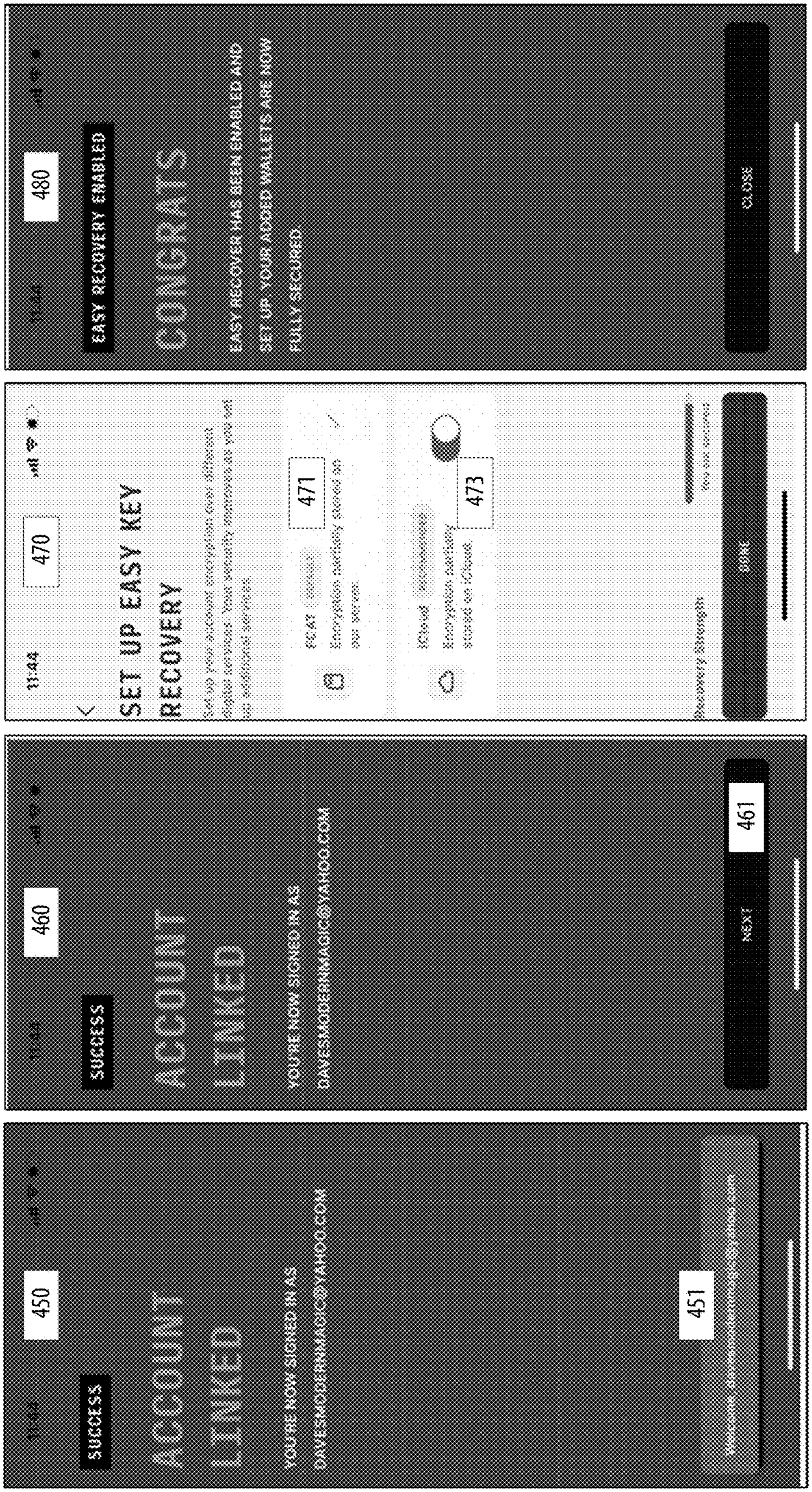
FIGURE 4B: E2EEHWKR SCREENSHOT

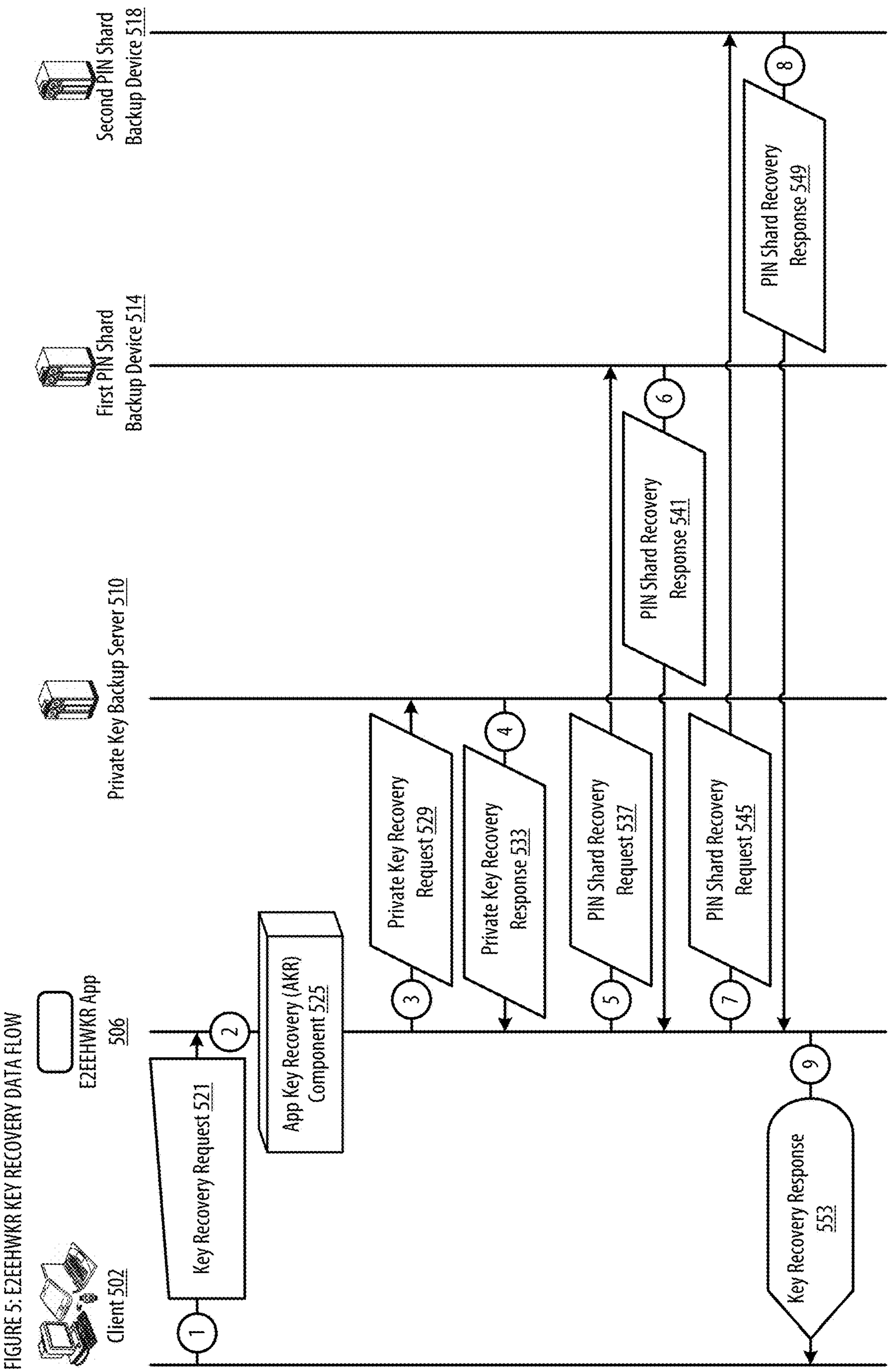
FIGURE 5: E2EEHWKR KEY RECOVERY DATA FLOW
Client 502
E2EEHWKR App 506
Private Key Backup Server 510
First PIN Shard Backup Device 514
Second PIN Shard Backup Device 518
Key Recovery Request 521
App Key Recovery (AKR) Component 525
Private Key Recovery Request 529
Private Key Recovery Response 533
PIN Shard Recovery Request 537
PIN Shard Recovery Response 541
PIN Shard Recovery Request 545
PIN Shard Recovery Response 549
Key Recovery Response 553
1
2
3
4
5
6
7
8
9

FIGURE 6: E2EEHWKR AKR COMPONENT
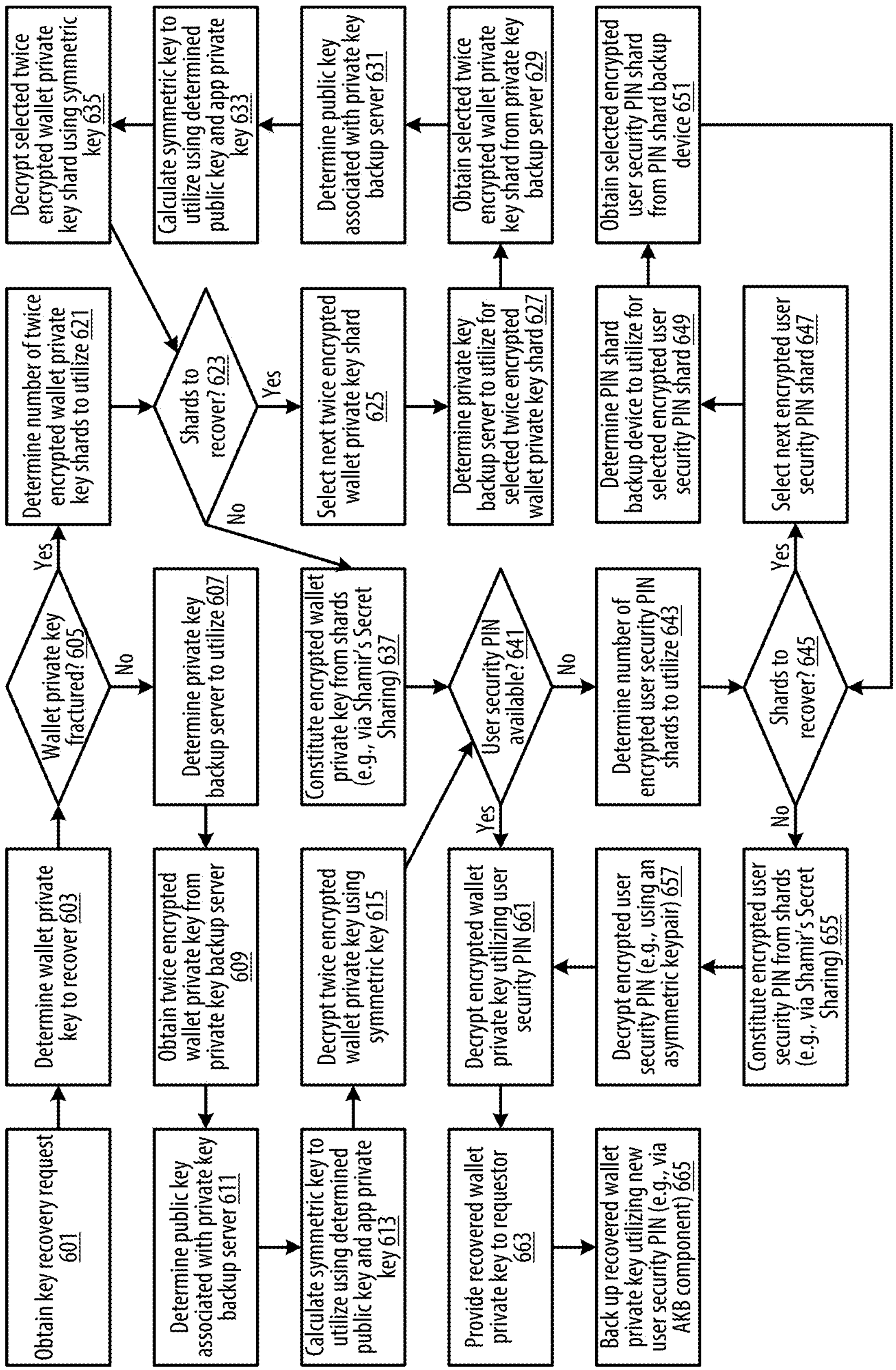

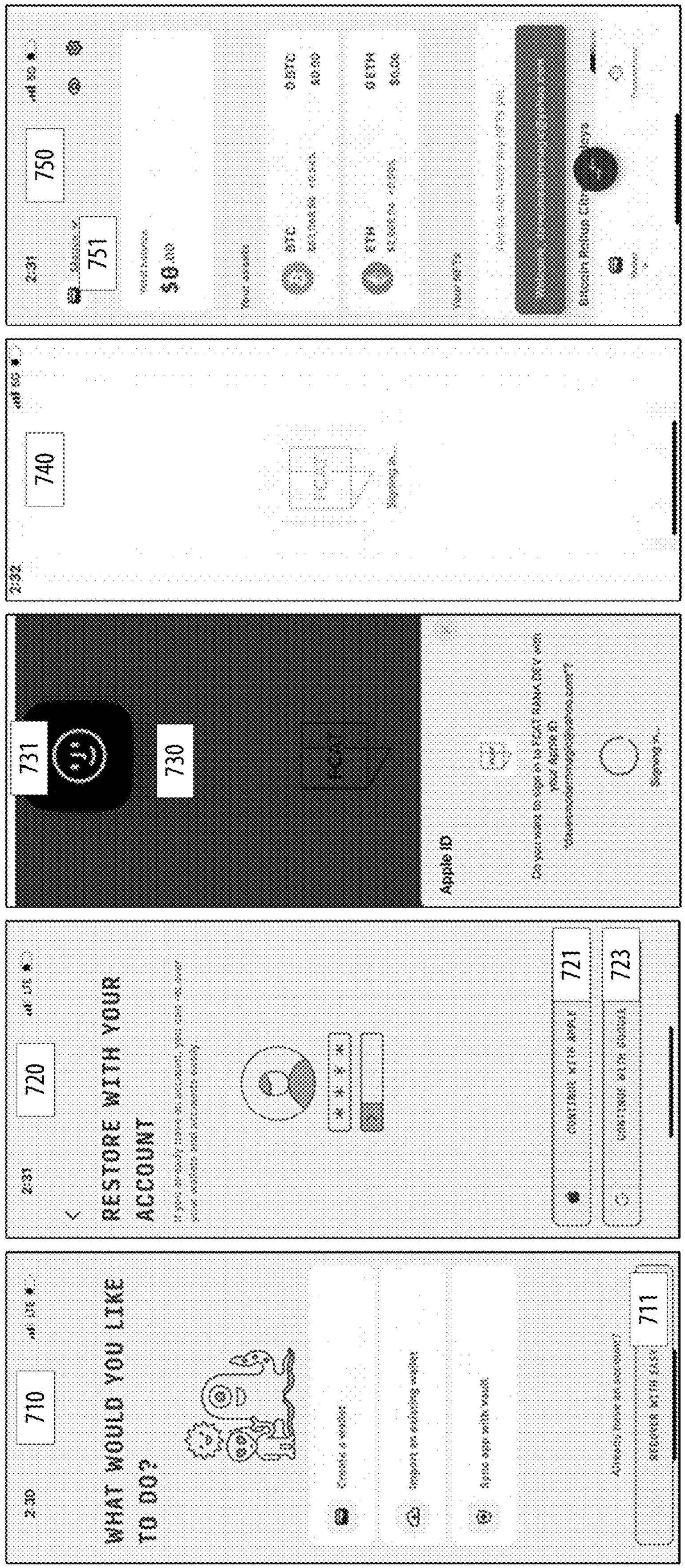
FIGURE 7: E2EEHWKR SCREENSHOT

FIGURE 8: E2EEHWKR Controller
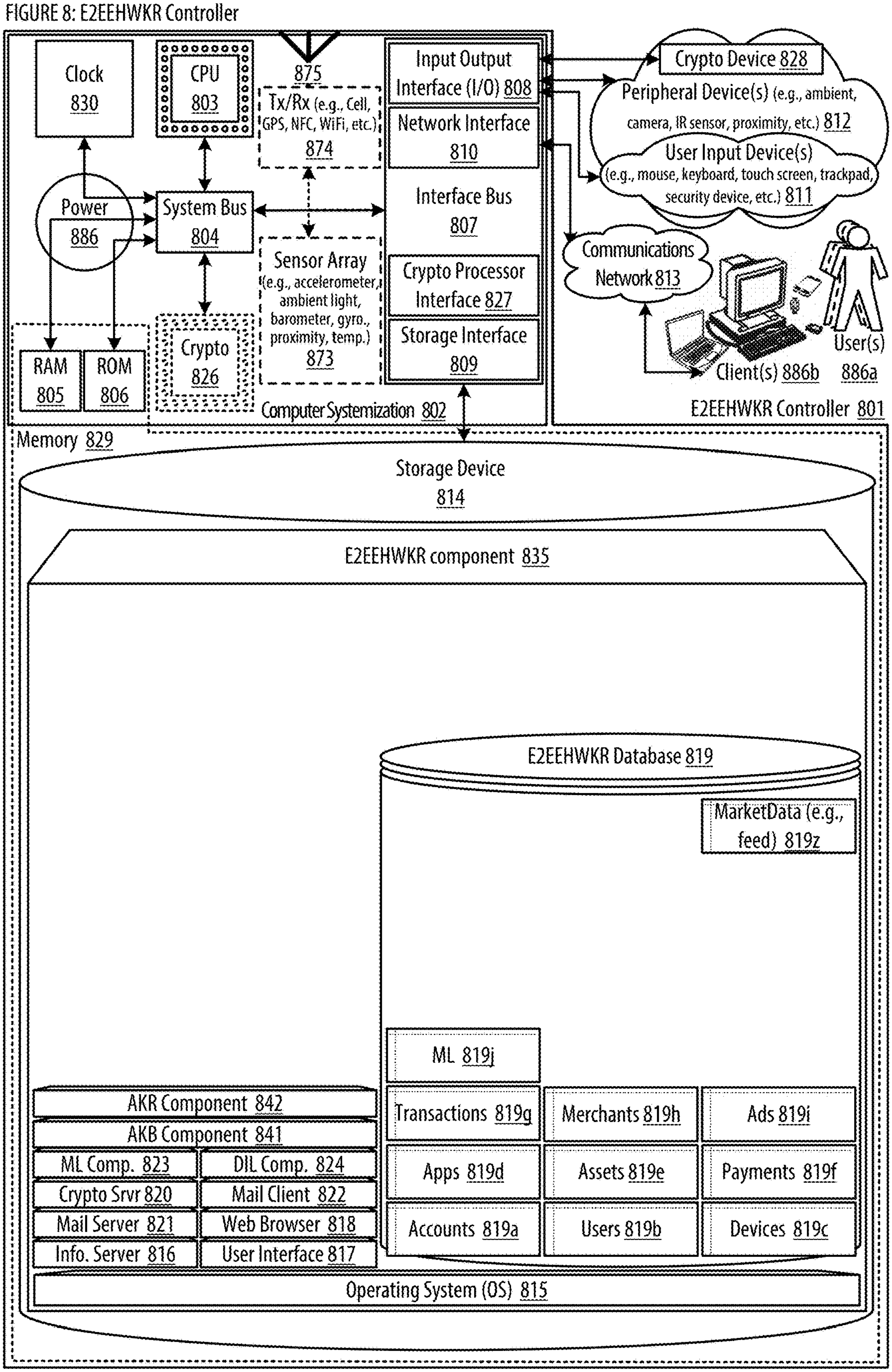

END-TO-END ENCRYPTION AND HOT WALLET KEY RECOVERY APPARATUSES, PROCESSES AND SYSTEMS

PRIORITY CLAIM

Applicant hereby claims benefit to priority under 35 USC § 119 as a non-provisional conversion of: U.S. provisional patent application Ser. No. 63/596,963, filed Nov. 7, 2023, entitled "End-to-End Encryption and Hot Wallet Key Recovery Apparatuses, Processes and Systems".

The entire contents of the aforementioned applications are herein expressly incorporated by reference.

This application for letters patent disclosure document describes inventive aspects that include various novel innovations (hereinafter "disclosure") and contains material that is subject to any of: copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address encryption key recovery, and more particularly, include End-to-End Encryption and Hot Wallet Key Recovery Apparatuses, Processes and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Bitcoin is an open source software application and a shared protocol. It allows users to anonymously and instantaneously transact Bitcoin, a digital currency, without needing to trust counterparties or separate intermediaries. Bitcoin achieves this trustless anonymous network using public/private key pairs, a popular encryption technique.

BRIEF DESCRIPTION OF THE DRAWINGS

Appendices and/or drawings illustrating various, non-limiting, example, innovative aspects of the End-to-End Encryption and Hot Wallet Key Recovery Apparatuses, Processes and Systems (hereinafter "E2EEHWKR") disclosure, include:

FIG. 1 shows non-limiting, example embodiments of an architecture for the E2EEHWKR;

FIG. 2 shows non-limiting, example embodiments of a datagraph illustrating key backup data flow(s) for the E2EEHWKR;

FIG. 3 shows non-limiting, example embodiments of a logic flow illustrating an app key backup (AKB) component for the E2EEHWKR;

FIGS. 4A-B show non-limiting, example embodiments of a screenshot illustrating user interface(s) of the E2EEHWKR;

FIG. 5 shows non-limiting, example embodiments of a datagraph illustrating key recovery data flow(s) for the E2EEHWKR;

FIG. 6 shows non-limiting, example embodiments of a logic flow illustrating an app key recovery (AKR) component for the E2EEHWKR;

FIG. 7 shows non-limiting, example embodiments of a screenshot illustrating user interface(s) of the E2EEHWKR;

FIG. 8 shows a block diagram illustrating non-limiting, example embodiments of a E2EEHWKR controller.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citations and/or reference numbers are not necessarily sequences but rather just example orders that may be rearranged and other orders are contemplated. Citation number suffixes may indicate that an earlier introduced item has been re-referenced in the context of a later figure and may indicate the same item, evolved/modified version of the earlier introduced item, etc., e.g., server 199 of FIG. 1 may be a similar server 299 of FIG. 2 in the same and/or new context.

DETAILED DESCRIPTION

The End-to-End Encryption and Hot Wallet Key Recovery Apparatuses, Processes and Systems (hereinafter "E2EEHWKR") transforms key backup request, key recovery request datastructure/inputs, via E2EEHWKR components (e.g., AKB, AKR, etc. components), into key backup response, key recovery response outputs. The E2EEHWKR components, in various embodiments, implement advantageous features as set forth below.

INTRODUCTION

The E2EEHWKR provides unconventional features (e.g., storing an encrypted wallet private key encrypted utilizing a user security PIN, fracturing the user security PIN, and storing user security PIN shards in multiple storage locations) that were never before available in encryption key recovery.

In one embodiment, E2EEHWKR secures 'key' generation from a E2EEHWKR mobile wallet on phone and securing shards in various locations (e.g., Cloud, Phone, Fidelity HSM, Cold Storage device, etc.) using end-to-end encryption ("E2EE").

E2EEHWKR is an innovation in the hot wallet key recovery service marketplace. Other backup and recovery writes and keeps custody of 12- or 24-word seed phrases that are able to regenerate a user's wallet. This makes for bad UX and security. E2EEHWKR provides a far improved and more innovative service. Notably, these services typically begin and end by allowing users to store an encrypted private key in the user's associated iCloud account. The user encrypts the private key with a pin. Such a solution may be a little bit better, but still falls short of optimal, particularly on security.

As such E2EEHWKR takes this much further: a user encrypts his private key with a pin known only to him. The user may then send his encrypted key to a server managed by a facilitator, e.g., Fidelity, for which we can mathematically prove we cannot decrypt any encrypted keys held on server. We then prompt user to shard the decryption pin (user security PIN) and relay it to several storage locations: iCloud, mobile phone, cold-storage Vault, and our server, and/or the like.

PoC Integration with E2EEHWKR

Example PoC features and capabilities include:

0022.1. On device key generation (Vault & Mobile)
0022.2. Store digital assets on both Vault & Hot Wallet
0022.3. View digital assets on both Vault & Hot Wallet
0022.4. Transfer digital assets to/from any wallet via both Vault & Hot Wallet
0022.5. Recover/import wallet using both Vault & Hot Wallet
0022.6. Server based private key (wallet) recovery Example PoC use cases include:

0023.1. On device key generation
0023.1.1. Vault (Cold Wallet)
0023.1.2. Phone (Hot Wallet)
0023.2. Send crypto from vault
0023.2.1. Vault scans phone proposed transaction via QR scan, signs transaction and displays QR
0023.2.2. Phone scans signed transaction from vault via QR and broadcasts to the network
0023.3. Transfer Crypto between Vault & Hot Wallet
0023.3.1. Send crypto from Hot Wallet to Vault
0023.3.2. Send crypto from Vault to Hot Wallet
0023.4. Send crypto from Hot Wallet to apps on Blockchain
0023.5. Receive crypto from any wallet address
0023.5.1. Receive to Hot Wallet
0023.5.2. Receive to Vault
0023.6. Key Recovery-multi-layered approach
0023.6.1. User encrypts private key via application and stores the encrypted data on key backup servers (e.g., managed by NGRAVE)
0023.7. E2EEHWKR can prove it has no way to decrypt the data
0023.8. Only the user can encrypt/decrypt the data via secure authentication via the application
0023.9. The User will have the option of storing shards of their encryption access with trusted parties to avail themselves of social recovery for the encryption capability
0023.10. Integrated Trading-Buy/Sell (via API integration)
0023.10.1. Integration with Green Meadows
0023.11. Aggregate non-local wallet holdings for full portfolio view (e.g., Digital Asset Tracker)
0023.12. News Feed Integration into Hot Wallet mobile app
0023.13. Swap 1 crypto for another via CEX or DEX Key Management Services (a.k.a. Recovery)

One example problem. Securing private keys is critical to ensuring owners retain access/control over their digital assets. Loss of access to private keys results in loss of utility of the digital assets held by the impaired wallet address.

While some users may be comfortable delegating control of their assets to exchanges or other intermediaries such as custodians, not all users are willing to accept the counterparty risk trade-offs. The crypto is riddled with occurrences of users who've lost their assets due to inadequate risk management or outright theft. These circumstances may fuel calls for self-custody and a refrain of "not your keys, not your coins".

Although not unique to those who self-custody, there are 3 main private key threats faced by digital asset owners:

0026.1. User error/loss of private key
0026.2. Theft of private key
0026.3. Human made/natural made disasters (e.g., fire/flood)

Digital asset owners who choose to self-custody have limited tools for mitigating the risks involved with managing private keys. Some practices may include writing down and storing mnemonic seed phrases that can be used to recover wallets. Some users record their seed phrases on medium such as metallic plates to better protect against water or fire damage and the potential for ink to fade over time.

One example solution the E2EEHWKR makes wallet recovery EASY . . . Encrypted, Accessible, Secure & Yours. E2EEHWKR may provide a service that ensures users maintain sole control of their digital assets while greatly mitigating the risks associated with loss of private keys. E2EEHWKR may provide the wallet recovery service without being designated a custodian by ensuring that E2EEHWKR only stores encrypted data and does not have the ability to decrypt or control the users' private keys.

In one example embodiment, E2EEHWKR can integrate with NGRAVE and can implement a server-based solution for storing encrypted data that users can call and decrypt to recover their private keys. The encryption/decryption mechanism may reside in an E2EEHWKR wallet applications (vault & mobile). Authentication/authorization of the encryption capability may be performed externally to an E2EEHWKR application, and the user may be responsible for securing and maintaining their encryption credentials. (In an alternative embodiment, utilization of social recovery or MPC technologies may be employed). In another embodiment, E2EEHWKR may hold a shard as long it was a minority (e.g., to ensure that E2EEHWKR does not have the ability to decrypt a private key by reconstructing a user security PIN from shards).

As such, E2EEHWKR encrypted data wallet recovery service is not limited only to holders of NGRAVE developed vault and hot wallet solutions, but may be utilized with any vault and/or hot wallet solutions. Practically speaking, the service is also extendable to digital asset wallet holders if the encryption/decryption of the data resides outside of E2EEHWKR. Additional embodiments may incorporate KYC/AML considerations in the situation where E2EEHWKR stores encrypted data and not customer value.

Key Recovery & Proof-of-Ownership Flow

In one embodiment, Proof of Ownership authentication for private key recovery via encrypted data stored on a E2EEHWKR managed server may be utilized for the hot wallet. In one embodiment, E2EEHWKR integrates with NGRAVE to store a shard of the Proof of Ownership key on the hardware wallet (vault).

The Proof of Ownership authentication will manage the encryption/decryption of the wallet private key data object.

NGRAVE may then integrate with E2EEHWKR Proof of Ownership capability with a focus on storage of the encryption library on the mobile device.

E2EEHWKR

FIG. 1 shows non-limiting, example embodiments of an architecture for the E2EEHWKR. In FIG. 1, an embodiment of how exchange of recovery data may be implemented via the E2EEHWKR is illustrated. A client device 110, such as a smartphone executing an E2EEHWKR app, may utilize a memory to store a wallet private key, an app private key, and a backup server public key. A backup server 120 may utilize a memory to store an encrypted wallet private key, an app public key, and a backup server private key. In one implementation, the client device and the backup server may utilize a shared secret (e.g., a symmetric cryptographic key generated via Diffie-Hellman Key-Exchange) to facilitate exchange of recovery data using E2EE. The client device may generate the shared secret using the app private key and the backup server public key. The backup server may generate the shared secret using the app public key and the backup server private key. When a user wishes to back up the wallet private key, the wallet private key may be encrypted on the client device using a user security PIN, encrypted a second time using the shared secret, and the twice encrypted wallet private key may be sent to the backup server. When a user wishes to restore the wallet private key, the twice encrypted wallet private key may be requested by the client device from the backup server, decrypted on the client device using the shared secret, and decrypted a second time using the user security PIN.

FIG. 2 shows non-limiting, example embodiments of a datagraph illustrating key backup data flow(s) for the E2EEHWKR. In FIG. 2, a client 202 (e.g., of a user) may send a key backup request 221 to an E2EEHWKR app 206 to facilitate a backup of a wallet private key. For example, the client may be a desktop, a laptop, a tablet, a smartphone, a smartwatch, and/or the like that is executing a client application. In one implementation, the key backup request may include data such as a request identifier, a wallet identifier, a key identifier, backup settings, and/or the like. In one embodiment, the client may provide the following example key backup request, substantially in the form of a (Secure) Hypertext Transfer Protocol ("HTTP(S)") POST message including extensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
  <timestamp>2020-12-31 23:59:59</timestamp>
  <user_accounts_details>
      <user_account_credentials>
          <user_name>JohnDaDoeDoeDoooe@gmail.com</user_name>
          <password>abc123</password>
          //OPTIONAL <cookie>cookieID</cookie>
          //OPTIONAL <digital_cert_link>www.mydigitalcertificate.com/
JohnDoeDaDoeDoe@gmail.com/mycertifcate.dc</digital_cert_link>
          //OPTIONAL <digital_certificate>_DATA_</digital_certificate>
      </user_account_credentials>
  </user_accounts_details>
  <client_details> //iOS Client with App and Webkit
          //it should be noted that although several client details
          //sections are provided to show example variants of client
          //sources, further messages may include only one to save
          //space
      <client_IP>10.0.0.123</client_IP>
      <user_agent_string>Mozilla/5.0 (iPhone; CPU iPhone OS 7_1_1 like Mac OS
X) AppleWebKit/537.51.2 (KHTML, like Gecko) Version/7.0 Mobile/11D201
Safari/9537.53</user_agent_string>
      <client_product_type>iPhone6,1</client_product_type>
      <client_serial_number>DNXXX1X1XXXX</client_serial_number>
      <client_UDID>3XXXXXXXXXXXXXXXXXXXXXXXXD</client_UDID>
      <client_OS>iOS</client_OS>
      <client_OS_version>7.1.1</client_OS_version>
      <client_app_type>app with webkit</client_app_type>
      <app_installed_flag>true</app_installed_flag>
      <app_name>E2EEHWKR.app</app_name>
      <app_version>1.0 </app_version>
      <app_webkit_name>Mobile Safari</client_webkit_name>
      <client_version>537.51.2</client_version>
  </client_details>
  <client_details> //iOS Client with Webbrowser
      <client_IP>10.0.0.123</client_IP>
      <user_agent_string>Mozilla/5.0 (iPhone; CPU iPhone OS 7_1_1 like Mac OS
X) AppleWebKit/537.51.2 (KHTML, like Gecko) Version/7.0 Mobile/11D201
Safari/9537.53</user_agent_string>
      <client_product_type>iPhone6,1</client_product_type>
      <client_serial_number>DNXXX1X1XXXX</client_serial_number>
      <client_UDID>3XXXXXXXXXXXXXXXXXXXXXXXXD</client_UDID>
      <client_OS>iOS</client_OS>
      <client_OS_version>7.1.1</client_OS_version>
      <client_app_type>web browser</client_app_type>
      <client_name>Mobile Safari</client_name>
      <client_version>9537.53</client_version>
  </client_details>
  <client_details> //Android Client with Webbrowser
      <client_IP>10.0.0.123</client_IP>
      <user_agent_string>Mozilla/5.0 (Linux; U; Android 4.0.4; en-us; Nexus
S Build/IMM76D) AppleWebKit/534.30 (KHTML, like Gecko) Version/4.0 Mobile
Safari/534.30</user_agent_string>
      <client_product_type>Nexus S</client_product_type>
      <client_serial_number>YXXXXXXXXZ</client_serial_number>
      <client_UDID>FXXXXXXXXX-XXXX-XXXX-XXXX-XXXXXXXXXXXXX</client_UDID>
```

-continued

```
        <client__OS>Android</client__OS>
        <client__OS__version>4.0.4</client__OS__version>
        <client__app__type>web browser</client__app__type>
        <client__name>Mobile Safari</client__name>
        <client__version>534.30</client__version>
    </client__details>
    <client__details> //Mac Desktop with Webbrowser
        <client__IP>10.0.0.123</client__IP>
        <user__agent__string>Mozilla/5.0 (Macintosh; Intel Mac OS X 10__9__3)
AppleWebKit/537.75.14 (KHTML, like Gecko) Version/7.0.3
Safari/537.75.14</user__agent__string>
        <client__product__type>MacPro5,1</client__product__type>
        <client__serial__number>YXXXXXXXXZ</client__serial__number>
        <client__UDID>FXXXXXXXXX-XXXX-XXXX-XXXX-XXXXXXXXXXXXX</client__UDID>
        <client__OS>Mac OS X</client__OS>
        <client__OS__version>10.9.3</client__OS__version>
        <client__app__type>web browser</client__app__type>
        <client__name>Mobile Safari</client__name>
        <client__version>537.75.14</client__version>
    </client__details>
    <key__backup__request>
      <request__identifier>ID__request__1</request__identifier>
      <wallet__identifier>ID__crypto__wallet__1</wallet__identifier>
      <key__identifier>ID__wallet__private__key__1</key__identifier>
      <backup__settings>
        <wallet__private__key__settings>
          <fracture__key>FALSE</fracture__key>
          <private__key__backup__server>
            ID__backup__server__1
          </private__key__backup__server>
        </wallet__private__key__settings>
        <user__security__PIN__settings>
          <fracture__PIN>TRUE</fracture__PIN>
          <M__of__N>2 of 4</M__of__N>
          <PIN__shard__backup__devices>
            ID__HSM__1, ID__iCloud__account__1, ID__mobile__device__1,
ID__backup__server__1
          </PIN__shard__backup__devices>
        </user__security__PIN__settings>
      </backup__settings>
    </key__backup__request>
</auth__request>
```

An app key backup (AKB) component 225 may utilize data provided in the key backup request to back up the wallet private key in accordance with the backup settings. See FIG. 3 for additional details regarding the AKB component.

The E2EEHWKR app 206 may send a private key backup request 229 to a private key backup server 210 to facilitate storing an encrypted wallet private key or an encrypted wallet private key shard. In one implementation, the private key backup request may include data such as a request identifier, a wallet identifier, a key identifier, encrypted wallet private key data, and/or the like. In one embodiment, the E2EEHWKR app may provide the following example private key backup request, substantially in the form of a HTTP(S) POST message including XML-formatted data, as provided below:

```
POST /private__key__backup__request.php HTTP/1.1
Host: www.server.com
Content-Type: Application/XML
Content-Length: 667
<?XML version = "1.0" encoding = "UTF-8"?>
<private__key__backup__request>
  <request__identifier>ID__request__2</request__identifier>
  <wallet__identifier>ID__crypto__wallet__1</wallet__identifier>
  <key__identifier>ID__wallet__private__key__1</key__identifier>
  <encrypted__wallet__private__key__data>
    <data__type>ENCRYPTED__WALLET__PRIVATE__KEY</data__type>
    <data__value>twice encrypted wallet private key</data__value>
  </encrypted__wallet__private__key__data>
</private__key__backup__request>
```

The private key backup server 210 may send a private key backup response 233 to the E2EEHWKR app 206 to confirm that the encrypted wallet private key or the encrypted wallet private key shard was stored successfully. In one implementation, the private key backup response may include data such as a response identifier, a status, and/or the like. In one embodiment, the private key backup server may provide the following example private key backup response, substantially in the form of a HTTP(S) POST message including XML-formatted data, as provided below:

```
POST /private_key_backup_response.php HTTP/1.1
Host: www.server.com
Content-Type: Application/XML
Content-Length: 667
<?XML version = "1.0" encoding = "UTF-8"?>
<private_key_backup_response>
  <response_identifier>ID_response_2</response_identifier>
```

-continued

```
  <status>OK</status>
</private_key_backup_response>
```

The E2EEHWKR app 206 may send a PIN shard backup request 237 to a first PIN shard backup device 214 to facilitate storing a first shard of an encrypted user security PIN. For example, a PIN shard backup device may be a cloud (e.g., an iCloud account), a mobile phone, a cold storage device (e.g., a cold-storage vault), a hardware security module (HSM), a backup server (e.g., a private key (shard) backup server), a trusted contact, and/or the like. In one implementation, the PIN shard backup request may include data such as a request identifier, a wallet identifier, a key identifier, encrypted user security PIN shard data, and/or the like. In one embodiment, the E2EEHWKR app may provide the following example PIN shard backup request, substantially in the form of a HTTP(S) POST message including XML-formatted data, as provided below:

```
POST /PIN_shard_backup_request.php HTTP/1.1
Host: www.server.com
Content-Type: Application/XML
Content-Length: 667
<? XML version = "1.0" encoding = "UTF-8"?>
<PIN_shard_backup_request>
  <request_identifier>ID_request_3</request_identifier>
  <wallet_identifier>ID_crypto_wallet_1</wallet_identifier>
  <key_identifier>ID_wallet_private_key_1</key_identifier>
  <encrypted_user_security_PIN_shard_data>
    <data_type>ENCRYPTED_USER_SECURITY_PIN_SHARD</data_type>
    <data_value>first encrypted user security PIN shard</data_value>
  </encrypted_user_security_PIN_shard_data>
</PIN_shard_backup_request>
```

The first PIN shard backup device 214 may send a PIN shard backup response 241 to the E2EEHWKR app 206 to confirm that the first encrypted user security PIN shard was stored successfully. In one implementation, the PIN shard backup response may include data such as a response identifier, a status, and/or the like. In one embodiment, the first PIN shard backup device may provide the following example PIN shard backup response, substantially in the form of a HTTP(S) POST message including XML-formatted data, as provided below:

```
POST /PIN_shard_backup_response.php HTTP/1.1
Host: www.server.com
Content-Type: Application/XML
Content-Length: 667
<?XML version = "1.0" encoding = "UTF-8"?>
<PIN_shard_backup_response>
  <response_identifier>ID_response_3</response_identifier>
  <status>OK</status>
</PIN_shard_backup_response>
```

The E2EEHWKR app 206 may send a PIN shard backup request 245 to a second PIN shard backup device 218 to facilitate storing a second shard of the encrypted user security PIN. It is to be understood that additional PIN shard backup requests may be similarly sent to additional PIN shard backup devices in accordance with the number of shards to back up (e.g., based on the N value of the M_of_N field of the user_security_PIN_setting field). In one implementation, the PIN shard backup request may include data such as a request identifier, a wallet identifier, a key identifier, encrypted user security PIN shard data, and/or the like. In one embodiment, the E2EEHWKR app may provide the following example PIN shard backup request, substantially in the form of a HTTP(S) POST message including XML-formatted data, as provided below:

```
POST /PIN_shard_backup_request.php HTTP/1.1
Host: www.server.com
Content-Type: Application/XML
Content-Length: 667
<?XML version = "1.0" encoding = "UTF-8"?>
<PIN_shard_backup_request>
  <request_identifier>ID_request_4</request_identifier>
  <wallet_identifier>ID_crypto_wallet_1</wallet_identifier>
  <key_identifier>ID_wallet_private_key_1</key_identifier>
  <encrypted_user_security_PIN_shard_data>
    <data_type>ENCRYPTED_USER_SECURITY_PIN_SHARD</data_type>
    <data_value>second encrypted user security PIN shard</data_value>
  </encrypted_user_security_PIN_shard_data>
</PIN_shard_backup_request>
```

The second PIN shard backup device 218 may send a PIN shard backup response 249 to the E2EEHWKR app 206 confirm that the second encrypted user security PIN shard was stored successfully. In one implementation, the PIN shard backup response may include data such as a response identifier, a status, and/or the like. In one embodiment, the second PIN shard backup device may provide the following example PIN shard backup response, substantially in the form of a HTTP(S) POST message including XML-formatted data, as provided below:

```
POST /PIN_shard_backup_response.php HTTP/1.1
Host: www.server.com
Content-Type: Application/XML
Content-Length: 667
<?XML version = "1.0" encoding = "UTF-8"?>
<PIN_shard_backup_response>
  <response_identifier>ID_response_4</response_identifier>
  <status>OK</status>
</PIN_shard_backup_response>
```

The E2EEHWKR app 206 may send a key backup response 253 to the client 202 to inform the user whether the wallet private key was backed up successfully. In one implementation, the key backup response may include data such as a response identifier, a status, and/or the like. In one embodiment, the E2EEHWKR app may provide the following example key backup response, substantially in the form of a HTTP(S) POST message including XML-formatted data, as provided below:

```
POST /key_backup_response.php HTTP/1.1
Host: www.server.com
Content-Type: Application/XML
Content-Length: 667
<?XML version = "1.0" encoding = "UTF-8"?>
<key_backup_response>
  <response_identifier>ID_response_1</response_identifier>
  <status>OK</status>
</key_backup_response>
```

FIG. 3 shows non-limiting, example embodiments of a logic flow illustrating an app key backup (AKB) component for the E2EEHWKR. In FIG. 3, a key backup request may be obtained from a requestor (e.g., a user) at 301. For example, the key backup request may be obtained as a result of a request from the user to back up a wallet private key.

A wallet private key to back up may be determined at 303. For example, the wallet private key may provide the user with access to and/or control ovel over digital assets (e.g., crypto currency such as Bitcoin, Ethereum, etc.). In one implementation, the key backup request may be parsed (e.g., using PHP commands) to determine the wallet private key to back up (e.g., based on the values of the wallet_identifier and/or key_identifier fields).

A user security PIN to utilize may be determined at 305. In one embodiment, the user security PIN may be a password provided by the user that is not retained by the E2EEHWKR. In one implementation, the user security PIN may be obtained from the user via the user interface of an E2EEHWKR app. For example, the user may be prompted to enter the user security PIN via the user interface.

The wallet private key may be encrypted utilizing the user security PIN at 307. In one embodiment, an encryption library (e.g., implementing a security protocol such as Advanced Encryption Standard (AES)) may be utilized to encrypt the wallet private key utilizing the user security PIN. In one implementation, an API call may be made to the encryption library (e.g., OpenSSL) to encrypt the wallet private key utilizing the user security PIN as a symmetric cryptographic key.

A determination may be made at 309 whether to fracture the encrypted wallet private key. In one implementation, the key backup request may be parsed (e.g., using PHP commands) to determine whether to fracture the encrypted wallet private key (e.g., based on the value of the fracture_key field).

If the encrypted wallet private key should not be fractured, a private key backup server to utilize may be determined at 311. In one embodiment, a private key backup server may be utilized to store the encrypted wallet private key and may be structured to not have the ability to derypt the encrypted wallet private key (e.g., the user security PIN is not accessible by the private key backup server). In one implementation, the key backup request may be parsed (e.g., using PHP commands) to determine the private key backup server to utilize (e.g., based on the value of the private_key_backup_server field). In another implementation, a default private key backup server may be utilized.

A public key associated with the private key backup server may be determined at 313. In one embodiment, the public key of a private key backup server may be obtained in advance and stored via a database of the E2EEHWKR. In another embodiment, the public key of a private key backup server may be obtained via an SSL/TLS certificate. In one implementation, the public key associated with the private key backup server may be obtained (e.g., from the database, from the SSL/TLS certificate) based on the identifier of the private key backup server.

A symmetric key to utilize may be calculated using the determined public key and an app private key associated with the E2EEHWKR app at 315. In one embodiment, Diffie-Hellman Key-Exchange may be utilized to calculate the symmetric key. In one implementation, the symmetric key to utilize may be calculated via the Diffie-Hellman Key-Exchange using the determined public key and the app private key.

The encrypted wallet private key may be encrypted a second time using the calculated symmetric key at 317. In one embodiment, an encryption library (e.g., implementing a security protocol such as AES) may be utilized to encrypt the encrypted wallet private key a second time utilizing the calculated symmetric key. In one implementation, an API call may be made to the encryption library (e.g., OpenSSL) to encrypt the encrypted wallet private key a second time utilizing the calculated symmetric key.

The twice encrypted wallet private key may be sent to the private key backup server at 319. In one implementation, the twice encrypted wallet private key may be sent to the private key backup server via a private key backup request.

If the encrypted wallet private key should be fractured, the number of encrypted wallet private key shards to utilize may be determined at 321. In one embodiment, an M of N fracture scheme may be utilized, in which the encrypted wallet private key is fractured into N shards and M of these shards are sufficient to constitute the encrypted wallet private key. In one implementation, the key backup request may be parsed (e.g., using PHP commands) to determine the number of encrypted wallet private key shards to utilize (e.g., based on the N value of an M_of_N field of the wallet_private_key_settings field).

The encrypted wallet private key may be fractured into shards at 323. In one implementation, a method such as Shamir's secret sharing may be utilized to fracture the encrypted wallet private key into shards. For example, a generated shard may comprise a number (e.g., in hexadecimal format) specifying the shard's value.

A determination may be made at 325 whether there remain encrypted wallet private key shards to back up. In one implementation, each of the generated encrypted wallet private key shards may be backed up. If there remain encrypted wallet private key shards to back up, the next encrypted wallet private key shard may be selected for processing at 327.

A private key backup server to utilize for the selected shard of the encrypted wallet private key may be determined at 329. In one embodiment, a private key backup server may be utilized to store the selected encrypted wallet private key shard. In one implementation, the key backup request may be parsed (e.g., using PHP commands) to determine private key backup servers to utilize (e.g., based on the values of the private_key_backup_server field), and one of the private key backup servers may be selected. In another implementation, one of default private key backup servers may be utilized.

A public key associated with the private key backup server for the selected shard may be determined at 331. In one embodiment, the public key of a private key backup server may be obtained in advance and stored via a database of the E2EEHWKR. In another embodiment, the public key of a private key backup server may be obtained via an SSL/TLS certificate. In one implementation, the public key associated with private key backup server for the selected shard may be determined (e.g., from the database, from the SSL/TLS certificate) based on the identifier of the private key backup server for the selected shard.

A symmetric key to utilize for the selected shard may be calculated using the determined public key associated with the private key backup server for the selected shard and the app private key at 333. In one embodiment, Diffie-Hellman Key-Exchange may be utilized to calculate the symmetric key to utilize for the selected shard. In one implementation, the symmetric key to utilize for the selected shard may be calculated via the Diffie-Hellman Key-Exchange using the determined public key associated with the private key backup server for the selected shard and the app private key.

The selected encrypted wallet private key shard may be encrypted a second time using the calculated symmetric key for the selected shard at 335. In one embodiment, an encryption library (e.g., implementing a security protocol such as AES) may be utilized to encrypt the selected encrypted wallet private key shard a second time utilizing the calculated symmetric key for the selected shard. In one implementation, an API call may be made to the encryption library (e.g., OpenSSL) to encrypt the selected encrypted wallet private key shard a second time utilizing the calculated symmetric key for the selected shard.

The twice encrypted wallet private key shard may be sent to the private key backup server for the selected shard at 337. In one implementation, the twice encrypted wallet private key shard may be sent to the private key backup server for the selected shard via a private key backup request.

The user security PIN may be encrypted at 339. In one embodiment, an encryption library (e.g., implementing a security protocol such as RSA) may be utilized to encrypt the user security PIN utilizing an asymmetric keypair. In one implementation, an API call may be made to the encryption library (e.g., OpenSSL) to generate an asymmetric keypair (e.g., RSA keypair) and/or to encrypt the user security PIN utilizing the public key of the asymmetric keypair. For example, the private key of the asymmetric keypair may be associated with the encrypted user security PIN and stored via a database of the E2EEHWKR.

The number of encrypted user security PIN shards to utilize may be determined at 341. In one embodiment, an M of N fracture scheme may be utilized, in which the encrypted user security PIN is fractured into N shards and M of these shards are sufficient to constitute the encrypted user security PIN. In one implementation, the key backup request may be parsed (e.g., using PHP commands) to determine the number of encrypted user security PIN shards to utilize (e.g., based on the N value of the M_of_N field of the user_security_PIN_setting field). For example, 4 shards of the encrypted user security PIN may be utilized.

The encrypted user security PIN may be fractured into shards at 343. In one implementation, a method such as Shamir's secret sharing may be utilized to fracture the encrypted user security PIN into shards. For example, a generated shard may comprise a number (e.g., in hexadecimal format) specifying the shard's value.

A determination may be made at 345 whether there remain encrypted user security PIN shards to back up. In one implementation, each of the encrypted user security PIN shards may be backed up. If there remain encrypted user security PIN shards to back up, the next encrypted user security PIN shard may be selected for processing at 347.

A PIN shard backup device to utilize for the selected encrypted user security PIN shard may be determined at 349. For example, a PIN shard backup device may be a cloud (e.g., an iCloud account), a mobile phone, a cold storage device (e.g., a cold-storage vault), a hardware security module (HSM), a backup server (e.g., a private key (shard) backup server), a trusted contact, and/or the like. In one embodiment, a PIN shard backup device may be utilized to store the selected encrypted user security PIN shard. In one implementation, the key backup request may be parsed (e.g., using PHP commands) to determine the PIN shard backup devices to utilize (e.g., based on the values of the PIN_shard_backup_devices field), and one of the PIN shard backup devices may be selected. In another implementation, one of default PIN shard backup devices may be utilized.

The selected encrypted user security PIN shard may be sent to the PIN shard backup device for the selected shard at 353. In one implementation, the selected encrypted user security PIN shard may be sent to the PIN shard backup device for the selected shard via a PIN shard backup request.

A key backup confirmation may be provided to the requestor at 355. For example, the key backup confirmation may be used to inform the user whether the wallet private key was backed up successfully. In one implementation, the key backup confirmation may be sent to the requestor via a key backup response.

FIGS. 4A-B show non-limiting, example embodiments of a screenshot illustrating user interface(s) of the E2EEHWKR. In FIGS. 4A-B, an exemplary user interface (e.g., for a mobile device, for a website) for facilitating backup of a wallet private key is illustrated. Screen 410 shows that a user may backup a wallet private key associated with a crypto wallet "Mauve" identified by a wallet selection widget 411 by going into settings via a settings widget 413. Screen 420 shows that the user may utilize an "Account & Wallets" widget 421 to view associated settings. Screen 430 shows that the user may utilize a "Set Up Easy Key Recovery" widget 431 to initiate backup of the wallet private key associated with the crypto wallet "Mauve". Screen 440 shows that the user may verify the user's identity using a third party (e.g., via OAuth protocol). For example, the user may verify using Apple with "Continue with Apple" widget 441. In another example, the user may verify using Google with "Continue with Google" widget 443. Screen 450 shows that the user's identity may be verified and the user's identifier (e.g., email address) may be shown via a welcome widget 451. Screen 460 shows that the user may utilize a "Next" widget 461 to continue backup of the wallet private key associated with the crypto wallet "Mauve". Screen 470 shows that the user may select PIN shard backup devices to utilize to back up a user security PIN utilized to encrypt the wallet private key associated with the crypto wallet "Mauve". For example, the user may choose to utilize a private key (shard) backup server via a selection widget 471. In another example, the user may choose to utilize an iCloud account via a selection widget 473. Screen 480 shows a key backup confirmation screen that may be provided to the user.

FIG. 5 shows non-limiting, example embodiments of a datagraph illustrating key recovery data flow(s) for the E2EEHWKR. In FIG. 5, a client 502 (e.g., of a user) may send a key recovery request 521 to an E2EEHWKR app 506 to facilitate a recovery of a wallet private key. For example, the client may be a desktop, a laptop, a tablet, a smartphone, a smartwatch, and/or the like that is executing a client application. In one implementation, the key recovery request may include data such as a request identifier, a wallet identifier, a key identifier, recovery settings, and/or the like. In one embodiment, the client may provide the following example key recovery request, substantially in the form of a HTTP(S) POST message including XML-formatted data, as provided below:

```
POST /key_recovery_request.php HTTP/1.1
Host: www.server.com
Content-Type: Application/XML
Content-Length: 667
<?XML version = "1.0" encoding = "UTF-8"?>
<key_recovery_request>
```

-continued

```
  <request_identifier>ID_request_11</request_identifier>
  <wallet_identifier>ID_crypto_wallet_1</wallet_identifier>
  <key_identifier>ID_wallet_private_key_1</key_identifier>
  <recovery_settings>
    <wallet_private_key_settings>
      <constitute_key>FALSE</constitute_key>
      <private_key_backup_server>
        ID_backup_server_1
      </private_key_backup_server>
    </wallet_private_key_settings>
    <user_security_PIN_settings>
      <constitute_PIN>TRUE</constitute_PIN>
      <M_of_N>2 of 4</M_of_N>
      <PIN_shard_backup_devices>
        ID_iCloud_account_1, ID_backup_server_1
      </PIN_shard_backup_devices>
    </user_security_PIN_settings>
  </recovery_settings>
</key_recovery_request>
```

An app key recovery (AKR) component 525 may utilize data provided in the key recovery request to recover the wallet private key in accordance with the recovery settings. See FIG. 6 for additional details regarding the AKR component.

The E2EEHWKR app 506 may send a private key recovery request 529 to a private key backup server 510 to facilitate retrieving an encrypted wallet private key or an encrypted wallet private key shard. In one implementation, the private key recovery request may include data such as a request identifier, a wallet identifier, a key identifier, and/or the like. In one embodiment, the E2EEHWKR app may provide the following example private key recovery request, substantially in the form of a HTTP(S) POST message including XML-formatted data, as provided below:

```
POST /private_key_recovery_request.php HTTP/1.1
Host: www.server.com
Content-Type: Application/XML
Content-Length: 667
<?XML version = "1.0" encoding = "UTF-8"?>
<private_key_recovery_request>
  <request_identifier>ID_request_12</request_identifier>
  <wallet_identifier>ID_crypto_wallet_1</wallet_identifier>
  <key_identifier>ID_wallet_private_key_1</key_identifier>
</private_key_recovery_request>
```

The private key backup server 510 may send a private key recovery response 533 to the E2EEHWKR app 506 with the requested encrypted wallet private key data. In one implementation, the private key recovery response may include data such as a response identifier, the requested encrypted wallet private key data, and/or the like. In one embodiment, the private key backup server may provide the following example private key recovery response, substantially in the form of a HTTP(S) POST message including XML-formatted data, as provided below:

```
POST /private__key__recovery__response.php HTTP/1.1
Host: www.server.com
Content-Type: Application/XML
Content-Length: 667
<?XML version = "1.0" encoding = "UTF-8"?>
<private__key__recovery__response>
  <response__identifier>ID__response__12</response__identifier>
  <encrypted__wallet__private__key__data>
    <data__type>ENCRYPTED__WALLET__PRIVATE__KEY</data__type>
    <data__value>twice encrypted wallet private key</data__value>
  </encrypted__wallet__private__key__data>
</private__key__recovery__response>
```

The E2EEHWKR app 506 may send a PIN shard recovery request 537 to a first PIN shard backup device 514 to facilitate retrieving a first shard of an encrypted user security PIN. For example, a PIN shard backup device may be a cloud (e.g., an iCloud account), a mobile phone, a cold storage device (e.g., a cold-storage vault), a hardware security module (HSM), a backup server (e.g., a private key (shard) backup server), a trusted contact, and/or the like. In one implementation, the PIN shard recovery request may include data such as a request identifier, a wallet identifier, a key identifier, and/or the like. In one embodiment, the E2EEHWKR app may provide the following example PIN shard recovery request, substantially in the form of a HTTP(S) POST message including XML-formatted data, as provided below:

```
POST /PIN__shard__recovery__request.php HTTP/1.1
Host: www.server.com
Content-Type: Application/XML
Content-Length: 667
<?XML version = "1.0" encoding = "UTF-8"?>
<PIN__shard__recovery__request>
  <request__identifier>ID__request__13</request__identifier>
  <wallet__identifier>ID__crypto__wallet__1</wallet__identifier>
  <key__identifier>ID__wallet__private__key__1</key__identifier>
</PIN__shard__recovery__request>
```

The first PIN shard backup device 514 may send a PIN shard recovery response 541 to the E2EEHWKR app 506 with the requested encrypted user security PIN shard data. In one implementation, the PIN shard recovery response may include data such as a response identifier, the requested encrypted user security PIN shard data, and/or the like. In one embodiment, the first PIN shard backup device may provide the following example PIN shard recovery response, substantially in the form of a HTTP(S) POST message including XML-formatted data, as provided below:

```
POST /PIN__shard__recovery__response.php HTTP/1.1
Host: www.server.com
Content-Type: Application/XML
Content-Length: 667
<?XML version = "1.0" encoding = "UTF-8"?>
<PIN__shard__recovery__response>
  <response__identifier>ID__response__13</response__identifier>
  <encrypted__user__security__PIN__shard__data>
    <data__type>ENCRYPTED__USER__SECURITY__PIN__SHARD</data__type>
    <data__value>first encrypted user security PIN shard</data__value>
  </encrypted__user__security__PIN__shard__data>
</PIN__shard__recovery__response>
```

The E2EEHWKR app 506 may send a PIN shard recovery request 545 to a second PIN shard backup device 518 to facilitate retrieving a second shard of the encrypted user security PIN. It is to be understood that additional PIN shard recovery requests may be similarly sent to additional PIN shard backup devices in accordance with the number of shards used to constitute the encrypted user security PIN (e.g., based on the M value of the M_of_N field of the user_security_PIN_setting field). In one implementation, the PIN shard recovery request may include data such as a request identifier, a wallet identifier, a key identifier, and/or the like. In one embodiment, the E2EEHWKR app may provide the following example PIN shard recovery request, substantially in the form of a HTTP(S) POST message including XML-formatted data, as provided below:

```
POST /PIN__shard__recovery__request.php HTTP/1.1
Host: www.server.com
Content-Type: Application/XML
Content-Length: 667
<?XML version = "1.0" encoding = "UTF-8"?>
<PIN__shard__recovery__request>
  <request__identifier>ID__request__14</request__identifier>
  <wallet__identifier>ID__crypto__wallet__1</wallet__identifier>
  <key__identifier>ID__wallet__private__key__1</key__identifier>
</PIN__shard__recovery__request>
```

The second PIN shard backup device 518 may send a PIN shard recovery response 549 to the E2EEHWKR app 506 with the requested encrypted user security PIN shard data. In one implementation, the PIN shard recovery response may include data such as a response identifier, the requested encrypted user security PIN shard data, and/or the like. In one embodiment, the second PIN shard backup device may provide the following example PIN shard recovery response, substantially in the form of a HTTP(S) POST message including XML-formatted data, as provided below:

```
POST /PIN_shard_recovery_response.php HTTP/1.1
Host: www.server. com
Content-Type: Application/XML
Content-Length: 667
<?XML version = "1.0" encoding = "UTF-8"?>
<PIN_shard_recovery_response>
  <response_identifier>ID_response_14</response_identifier>
  <encrypted_user_security_PIN_shard_data>
    <data_type>ENCRYPTED_USER_SECURITY_PIN_SHARD</data_type>
    <data_value>second encrypted user security PIN shard</data_value>
  </encrypted_user_security_PIN_shard_data>
</PIN_shard_recovery_response>
```

The E2EEHWKR app 506 may send a key recovery response 553 to the client 502 to inform the user whether the wallet private key was recovered successfully and/or to provide the wallet private key to the user. In one implementation, the key recovery response may include data such as a response identifier, a status, a wallet private key, and/or the like. In one embodiment, the E2EEHWKR app may provide the following example key recovery response, substantially in the form of a HTTP(S) POST message including XML-formatted data, as provided below:

```
POST /key_recovery_response.php HTTP/1.1
Host: www.server.com
Content-Type: Application/XML
Content-Length: 667
<?XML version = "1.0" encoding = "UTF-8"?>
<key_recovery_response>
  <response_identifier>ID_response_11</response_identifier>
  <status>OK</status>
  <wallet_private_key>recovered wallet private key</wallet_private_key>
</key_recovery_response>
```

FIG. 6 shows non-limiting, example embodiments of a logic flow illustrating an app key recovery (AKR) component for the E2EEHWKR. In FIG. 6, a key recovery request may be obtained from a requestor (e.g., a user) at 601. For example, the key recovery request may be obtained as a result of a request from the user to recover a wallet private key.

A wallet private key to recover may be determined at 603. For example, the wallet private key may provide the user with access to and/or control ovel over digital assets (e.g., crypto currency such as Bitcoin, Ethereum, etc.). In one implementation, the key recovery request may be parsed (e.g., using PHP commands) to determine the wallet private key to recover (e.g., based on the values of the wallet_identifier and/or key_identifier fields).

A determination may be made at 605 whether the wallet private key was fractured during backup. In one implementation, the key recovery request may be parsed (e.g., using PHP commands) to determine whether the wallet private key was fractured during backup (e.g., based on the value of the constitute_key field).

If the wallet private key was not fractured during backup, a private key backup server to utilize may be determined at 607. In one implementation, the key recovery request may be parsed (e.g., using PHP commands) to determine the private key backup server to utilize (e.g., based on the value of the private_key_backup_server field). In another implementation, a default private key backup server may be utilized.

A twice encrypted wallet private key may be obtained from the private key backup server at 609. In one implementation, the twice encrypted wallet private key may be retrieved from the private key backup server via a private key recovery request.

A public key associated with the private key backup server may be determined at 611. In one embodiment, the public key of a private key backup server may be obtained in advance and stored via a database of the E2EEHWKR. In another embodiment, the public key of a private key backup server may be obtained via an SSL/TLS certificate. In one implementation, the public key associated with the private key backup server may be obtained (e.g., from the database, from the SSL/TLS certificate) based on the identifier of the private key backup server.

A symmetric key to utilize may be calculated using the determined public key and an app private key associated with an E2EEHWKR app at 613. In one embodiment, Diffie-Hellman Key-Exchange may be utilized to calculate the symmetric key. In one implementation, the symmetric key to utilize may be calculated via the Diffie-Hellman Key-Exchange using the determined public key and the app private key.

A twice encrypted wallet private key may be decrypted using the calculated symmetric key at 615. In one embodiment, an encryption library (e.g., implementing a security protocol such as AES) may be utilized to decrypt the twice encrypted wallet private key utilizing the calculated symmetric key. In one implementation, an API call may be made to the encryption library (e.g., OpenSSL) to decrypt the twice encrypted wallet private key utilizing the calculated symmetric key to obtain an encrypted wallet private key.

If the wallet private key was fractured during backup, the number of twice encrypted wallet private key shards to utilize may be determined at 621. In one embodiment, an M of N fracture scheme may be utilized, in which an encrypted wallet private key is fractured into N shards and M of these shards are sufficient to constitute the encrypted wallet private key. In one implementation, the key recovery request may be parsed (e.g., using PHP commands) to determine the number of twice encrypted wallet private key shards to utilize (e.g., based on the M value of an M_of_N field of the wallet_private_key_settings field).

A determination may be made at 623 whether there remain twice encrypted wallet private key shards to recover. In one implementation, additional twice encrypted wallet private key shards may be recovered until the number of recovered twice encrypted wallet private key shards matches the number of twice encrypted wallet private key shards to utilize. If there remain twice encrypted wallet private key shards to recover, the next twice encrypted wallet private key shard may be selected for processing at 625.

A private key backup server to utilize for the selected twice encrypted wallet private key shard may be determined at 627. In one implementation, the key recovery request may be parsed (e.g., using PHP commands) to determine private key backup servers to utilize (e.g., based on the values of the private_key_backup_server field), and a private key backup server associated with the selected twice encrypted wallet private key shard may be selected. In another implementation, a default private key backup server associated with the selected twice encrypted wallet private key shard may be utilized.

The selected twice encrypted wallet private key shard may be obtained from the private key backup server for the selected shard at 629. In one implementation, the selected twice encrypted wallet private key shard may be retrieved from the private key backup server for the selected shard via a private key recovery request.

A public key associated with the private key backup server for the selected shard may be determined at 631. In one embodiment, the public key of a private key backup server may be obtained in advance and stored via a database of the E2EEHWKR. In another embodiment, the public key of a private key backup server may be obtained via an SSL/TLS certificate. In one implementation, the public key associated with private key backup server for the selected shard may be determined (e.g., from the database, from the SSL/TLS certificate) based on the identifier of the private key backup server for the selected shard.

A symmetric key to utilize for the selected shard may be calculated using the determined public key associated with the private key backup server for the selected shard and the app private key at 633. In one embodiment, Diffie-Hellman Key-Exchange may be utilized to calculate the symmetric key to utilize for the selected shard. In one implementation, the symmetric key to utilize for the selected shard may be calculated via the Diffie-Hellman Key-Exchange using the determined public key associated with the private key backup server for the selected shard and the app private key.

The selected twice encrypted wallet private key shard may be decrypted using the symmetric key at 635. In one embodiment, an encryption library (e.g., implementing a security protocol such as AES) may be utilized to decrypt the selected twice encrypted wallet private key shard utilizing the calculated symmetric key for the selected shard. In one implementation, an API call may be made to the encryption library (e.g., OpenSSL) to decrypt the selected twice encrypted wallet private key shard utilizing the calculated symmetric key for the selected shard to obtain an encrypted wallet private key shard.

An encrypted wallet private key may be constituted from the recovered encrypted wallet private key shards at 637. In one implementation, a method such as Shamir's secret sharing may be utilized to constitute the encrypted wallet private key from the recovered encrypted wallet private key shards. For example, any arbitrary M shards may be used to constitute the encrypted wallet private key.

A determination may be made at 641 whether a user security PIN available. In one embodiment, if the user can provide the user security PIN via the user interface of the E2EEHWKR app (e.g., the user remembers the user security PIN), the user security PIN is available. If the user cannot provide the user security PIN (e.g., the user forgot the user security PIN), the user security PIN is not available.

If the user security PIN is not available, the number of encrypted user security PIN shards to utilize may be determined at 643. In one embodiment, an M of N fracture scheme may be utilized, in which an encrypted user security PIN is fractured into N shards and M of these shards are sufficient to constitute the encrypted user security PIN. In one implementation, the key recovery request may be parsed (e.g., using PHP commands) to determine the number of encrypted user security PIN shards to utilize (e.g., based on the M value of the M_of_N field of the user_security_PIN_setting field). For example, 2 shards of the encrypted user security PIN may be sufficient to constitute the encrypted user security PIN.

A determination may be made at 645 whether there remain encrypted user security PIN shards to recover. In one implementation, additional encrypted user security PIN shards may be recovered until the number of recovered encrypted user security PIN shards matches the number of encrypted user security PIN shards to utilize. If there remain encrypted user security PIN shards to recover, the next encrypted user security PIN shards may be selected for processing at 647.

A PIN shard backup device to utilize for the selected encrypted user security PIN shard may be determined at 649. For example, a PIN shard backup device may be a cloud (e.g., an iCloud account), a mobile phone, a cold storage device (e.g., a cold-storage vault), a hardware security module (HSM), a backup server (e.g., a private key (shard) backup server), a trusted contact, and/or the like. In one implementation, the key recovery request may be parsed (e.g., using PHP commands) to determine PIN shard backup devices to utilize (e.g., based on the values of the PIN_shard_backup_devices field), and a PIN shard backup device associated with the selected t encrypted user security PIN shard may be selected. In another implementation, a default PIN shard backup device associated with the selected encrypted user security PIN shard may be utilized.

The selected encrypted user security PIN shard may be obtained from the PIN shard backup device for the selected shard at 651. In one implementation, the selected encrypted user security PIN shard may be retrieved from the PIN shard backup device for the selected shard via a PIN shard recovery request.

An encrypted user security PIN may be constituted from the recovered encrypted user security PIN shards at 655. In one implementation, a method such as Shamir's secret sharing may be utilized to constitute the encrypted user security PIN from the recovered encrypted user security PIN shards. For example, in a 2 of 4 fracture scheme, any arbitrary 2 shards may be used to constitute the encrypted user security PIN.

The encrypted user security PIN may be decrypted at 657. In one embodiment, an encryption library (e.g., implementing a security protocol such as RSA) may be utilized to decrypt the encrypted user security PIN utilizing an asymmetric keypair (e.g., RSA keypair). In one implementation, an API call may be made to the encryption library (e.g., OpenSSL) to decrypt the encrypted user security PIN utilizing the private key of the asymmetric keypair to obtain a user security PIN. For example, the private key of the asymmetric keypair associated with the encrypted user security PIN may be retrieved via a database of the E2EEHWKR.

The encrypted wallet private key may be decrypted utilizing the user security PIN at 661. In one embodiment, an encryption library (e.g., implementing a security protocol such as AES) may be utilized to decrypt the encrypted wallet private key utilizing the user security PIN. In one implementation, an API call may be made to the encryption library (e.g., OpenSSL) to decrypt the encrypted wallet private key utilizing the user security PIN as a symmetric cryptographic key to obtain a wallet private key.

The recovered wallet private key may be provided to the requestor at 663. In one implementation, the recovered wallet private key may be provided to the requestor via a key recovery response.

In some embodiments, the recovered wallet private key may be backed up utilizing a new user security PIN at 665. For example, if the user forgot the user security PIN, the user may be prompted to create a new user security PIN and the recovered wallet private key may be encrypted utilizing the new user security PIN and backed up. In one implementation, the AKB component may be utilized to back up the recovered wallet private key utilizing a new user security PIN.

FIG. 7 shows non-limiting, example embodiments of a screenshot illustrating user interface(s) of the E2EEHWKR. In FIG. 7, an exemplary user interface (e.g., for a mobile device, for a website) for facilitating recovery of a wallet private key is illustrated. Screen 710 shows that a user may utilize a "Recover with Easy" widget 711 to initiate recovery of a wallet private key. Screen 720 shows that the user may verify the user's identity using a third party (e.g., via OAuth protocol). For example, the user may verify using Apple with "Continue with Apple" widget 721. In another example, the user may verify using Google with "Continue with Google" widget 723. Screen 730 shows that the user may verify the user's identity via a biometric authentication system (e.g., via Apple's Face ID facial recognition system). Screen 740 shows that the user's identity may be verified and the user may be signed in. Screen 750 shows that the wallet private key associated with a crypto wallet "Mauve" identified by a wallet selection widget 751 was recovered successfully, and the user now has access to and control over the crypto wallet "Mauve".

Additional Alternative Embodiment Examples

The following alternative example embodiments provide a number of variations of some of the already discussed principles for expanded color on the abilities of the E2EEHWKR. Additional embodiments may include:

1. A fracturable user security PIN based crypto wallet backup apparatus, comprising:
   - at least one memory;
   - a component collection stored in the at least one memory;
   - any of at least one processor disposed in communication with the at least one memory, the any of at least one processor executing processor-executable instructions from the component collection, storage of the component collection structured with processor-executable instructions comprising:
     - obtain, via the any of at least one processor, a key backup request datastructure, in which the key backup request datastructure is structured as specifying a wallet private key, a private key backup server identifier, a PIN shard fracture scheme definition, and a plurality of PIN shard backup devices;
     - obtain, via the any of at least one processor, a user security PIN;
     - encrypt, via the any of at least one processor, the wallet private key utilizing the user security PIN;
     - determine, via the any of at least one processor, a public key associated with the private key backup server identifier;
     - calculate, via the any of at least one processor, a symmetric key from the public key associated with the private key backup server identifier and an app private key;
     - encrypt, via the any of at least one processor, the encrypted wallet private key utilizing the symmetric key;
     - send, via the any of at least one processor, the twice encrypted wallet private key to a private key backup server corresponding to the private key backup server identifier;
     - generate, via the any of at least one processor, an asymmetric keypair;
     - encrypt, via the any of at least one processor, the user security PIN utilizing a public key of the asymmetric keypair;
     - generate, via the any of at least one processor, a number of encrypted user security PIN shards from the encrypted user security PIN using a secret sharing method, in which the number of encrypted user security PIN shards to generate is specified via the PIN shard fracture scheme definition; and
     - send, via the any of at least one processor, each of the generated encrypted user security PIN shards to a corresponding PIN shard backup device from the plurality of PIN shard backup devices.

2. The apparatus of embodiment 1, in which the PIN shard fracture scheme definition is structured as specifying an M of N fracture scheme.

3. The apparatus of embodiment 2, in which N specifies the number of encrypted user security PIN shards to generate and M specifies how many encrypted user security PIN shards are sufficient to constitute the encrypted user security PIN.

4. The apparatus of embodiment 1, in which a PIN shard backup device is one of: a cloud, a mobile device, a cold storage device, a hardware security module, a backup server, a trusted contact.

5. The apparatus of embodiment 1, in which the user security PIN is obtained from a user via a user security PIN interaction interface mechanism.

6. The apparatus of embodiment 1, in which the private key backup server is structured to be unable to decrypt the encrypted wallet private key.

7. The apparatus of embodiment 6, in which the private key backup server is structured not to have access to the user security PIN.

8. The apparatus of embodiment 1, in which the symmetric key is calculated via Diffie-Hellman Key-Exchange.

9. The apparatus of embodiment 1, in which the user security PIN is encrypted via an API call to an encryption library implementing a security protocol.

10. The apparatus of embodiment 1, in which the asymmetric keypair is an RSA keypair.

11. The apparatus of embodiment 1, in which the secret sharing method is Shamir's secret sharing.

12. The apparatus of embodiment 1, in which the storage of the component collection is further structured with processor-executable instructions comprising:

obtain, via the any of at least one processor, a key recovery request datastructure associated with the wallet private key, in which the key recovery request datastructure is structured as specifying a subset of the plurality of PIN shard backup devices;

obtain, via the any of at least one processor, the twice encrypted wallet private key from the private key backup server corresponding to the private key backup server identifier;

decrypt, via the any of at least one processor, the twice encrypted wallet private key utilizing the symmetric key to determine the encrypted wallet private key;

obtain, via the any of at least one processor, a number of encrypted user security PIN shards sufficient to constitute the encrypted user security PIN from the subset of the plurality of PIN shard backup devices;

constitute, via the any of at least one processor, the encrypted user security PIN from the obtained encrypted user security PIN shards using the secret sharing method;

decrypt, via the any of at least one processor, the encrypted user security PIN utilizing a private key of the asymmetric keypair to determine the user security PIN; and decrypt, via the any of at least one processor, the encrypted wallet private key utilizing the user security PIN to recover the wallet private key.

13. The apparatus of embodiment 12, in which the storage of the component collection is further structured with processor-executable instructions comprising:

provide, via the any of at least one processor, the recovered wallet private key to a requestor.

14. The apparatus of embodiment 12, in which the storage of the component collection is further structured with processor-executable instructions comprising:

generate, via the any of at least one processor, a user security PIN interaction interface mechanism; and obtain, via the any of at least one processor, an updated user security PIN from a user via the user security PIN interaction interface mechanism.

15. The apparatus of embodiment 14, in which the storage of the component collection is further structured with processor-executable instructions comprising:

generate, via the any of at least one processor, an updated key backup request datastructure, in which the updated key backup request datastructure is structured as specifying the recovered wallet private key, the private key backup server identifier, the PIN shard fracture scheme definition, the plurality of PIN shard backup devices, and the updated user security PIN.

16. A fracturable user security PIN based crypto wallet backup processor-readable, non-transient medium, the medium storing a component collection, storage of the component collection structured with processor-executable instructions comprising:

obtain, via the any of at least one processor, a key backup request datastructure, in which the key backup request datastructure is structured as specifying a wallet private key, a private key backup server identifier, a PIN shard fracture scheme definition, and a plurality of PIN shard backup devices;

obtain, via the any of at least one processor, a user security PIN;

encrypt, via the any of at least one processor, the wallet private key utilizing the user security PIN;

determine, via the any of at least one processor, a public key associated with the private key backup server identifier;

calculate, via the any of at least one processor, a symmetric key from the public key associated with the private key backup server identifier and an app private key;

encrypt, via the any of at least one processor, the encrypted wallet private key utilizing the symmetric key;

send, via the any of at least one processor, the twice encrypted wallet private key to a private key backup server corresponding to the private key backup server identifier;

generate, via the any of at least one processor, an asymmetric keypair;

encrypt, via the any of at least one processor, the user security PIN utilizing a public key of the asymmetric keypair;

generate, via the any of at least one processor, a number of encrypted user security PIN shards from the encrypted user security PIN using a secret sharing method, in which the number of encrypted user security PIN shards to generate is specified via the PIN shard fracture scheme definition; and send, via the any of at least one processor, each of the generated encrypted user security PIN shards to a corresponding PIN shard backup device from the plurality of PIN shard backup devices.

17. The medium of embodiment 16, in which the PIN shard fracture scheme definition is structured as specifying an M of N fracture scheme.

18. The medium of embodiment 17, in which N specifies the number of encrypted user security PIN shards to generate and M specifies how many encrypted user security PIN shards are sufficient to constitute the encrypted user security PIN.

19. The medium of embodiment 16, in which a PIN shard backup device is one of: a cloud, a mobile device, a cold storage device, a hardware security module, a backup server, a trusted contact.

20. The medium of embodiment 16, in which the user security PIN is obtained from a user via a user security PIN interaction interface mechanism.

21. The medium of embodiment 16, in which the private key backup server is structured to be unable to decrypt the encrypted wallet private key.

22. The medium of embodiment 21, in which the private key backup server is structured not to have access to the user security PIN.

23. The medium of embodiment 16, in which the symmetric key is calculated via Diffie-Hellman Key-Exchange.

24. The medium of embodiment 16, in which the user security PIN is encrypted via an API call to an encryption library implementing a security protocol.

25. The medium of embodiment 16, in which the asymmetric keypair is an RSA keypair.

26. The medium of embodiment 16, in which the secret sharing method is Shamir's secret sharing.

27. The medium of embodiment 16, in which the storage of the component collection is further structured with processor-executable instructions comprising:

obtain, via the any of at least one processor, a key recovery request datastructure associated with the wallet private key, in which the key recovery request datastructure is structured as specifying a subset of the plurality of PIN shard backup devices;

obtain, via the any of at least one processor, the twice encrypted wallet private key from the private key backup server corresponding to the private key backup server identifier; decrypt, via the any of at least one processor, the twice encrypted wallet private key utilizing the symmetric key to determine the encrypted wallet private key;

obtain, via the any of at least one processor, a number of encrypted user security PIN shards sufficient to constitute the encrypted user security PIN from the subset of the plurality of PIN shard backup devices;

constitute, via the any of at least one processor, the encrypted user security PIN from the obtained encrypted user security PIN shards using the secret sharing method;

decrypt, via the any of at least one processor, the encrypted user security PIN utilizing a private key of the asymmetric keypair to determine the user security PIN; and decrypt, via the any of at least one processor, the encrypted wallet private key utilizing the user security PIN to recover the wallet private key.

28. The medium of embodiment 27, in which the storage of the component collection is further structured with processor-executable instructions comprising:

provide, via the any of at least one processor, the recovered wallet private key to a requestor.

29. The medium of embodiment 27, in which the storage of the component collection is further structured with processor-executable instructions comprising:

generate, via the any of at least one processor, a user security PIN interaction interface mechanism; and obtain, via the any of at least one processor, an updated user security PIN from a user via the user security PIN interaction interface mechanism.

30. The medium of embodiment 29, in which the storage of the component collection is further structured with processor-executable instructions comprising:

generate, via the any of at least one processor, an updated key backup request datastructure, in which the updated key backup request datastructure is structured as specifying the recovered wallet private key, the private key backup server identifier, the PIN shard fracture scheme definition, the plurality of PIN shard backup devices, and the updated user security PIN.

31. A fracturable user security PIN based crypto wallet backup processor-implemented system, comprising:

means to store a component collection;

means to process processor-executable instructions from the component collection, storage of the component collection structured with processor-executable instructions comprising:

obtain, via the any of at least one processor, a key backup request datastructure, in which the key backup request datastructure is structured as specifying a wallet private key, a private key backup server identifier, a PIN shard fracture scheme definition, and a plurality of PIN shard backup devices;

obtain, via the any of at least one processor, a user security PIN;

encrypt, via the any of at least one processor, the wallet private key utilizing the user security PIN;

determine, via the any of at least one processor, a public key associated with the private key backup server identifier;

calculate, via the any of at least one processor, a symmetric key from the public key associated with the private key backup server identifier and an app private key;

encrypt, via the any of at least one processor, the encrypted wallet private key utilizing the symmetric key;

send, via the any of at least one processor, the twice encrypted wallet private key to a private key backup server corresponding to the private key backup server identifier;

generate, via the any of at least one processor, an asymmetric keypair;

encrypt, via the any of at least one processor, the user security PIN utilizing a public key of the asymmetric keypair;

generate, via the any of at least one processor, a number of encrypted user security PIN shards from the encrypted user security PIN using a secret sharing method, in which the number of encrypted user security PIN shards to generate is specified via the PIN shard fracture scheme definition; and send, via the any of at least one processor, each of the generated encrypted user security PIN shards to a corresponding PIN shard backup device from the plurality of PIN shard backup devices.

32. The system of embodiment 31, in which the PIN shard fracture scheme definition is structured as specifying an M of N fracture scheme.

33. The system of embodiment 32, in which N specifies the number of encrypted user security PIN shards to generate and M specifies how many encrypted user security PIN shards are sufficient to constitute the encrypted user security PIN.

34. The system of embodiment 31, in which a PIN shard backup device is one of: a cloud, a mobile device, a cold storage device, a hardware security module, a backup server, a trusted contact.

35. The system of embodiment 31, in which the user security PIN is obtained from a user via a user security PIN interaction interface mechanism.

36. The system of embodiment 31, in which the private key backup server is structured to be unable to decrypt the encrypted wallet private key.

37. The system of embodiment 36, in which the private key backup server is structured not to have access to the user security PIN.

38. The system of embodiment 31, in which the symmetric key is calculated via Diffie-Hellman Key-Exchange.

39. The system of embodiment 31, in which the user security PIN is encrypted via an API call to an encryption library implementing a security protocol.

40. The system of embodiment 31, in which the asymmetric keypair is an RSA keypair.

41. The system of embodiment 31, in which the secret sharing method is Shamir's secret sharing.

42. The system of embodiment 31, in which the storage of the component collection is further structured with processor-executable instructions comprising:

obtain, via the any of at least one processor, a key recovery request datastructure associated with the wallet private key, in which the key recovery request datastructure is structured as specifying a subset of the plurality of PIN shard backup devices;

obtain, via the any of at least one processor, the twice encrypted wallet private key from the private key backup server corresponding to the private key backup server identifier;

decrypt, via the any of at least one processor, the twice encrypted wallet private key utilizing the symmetric key to determine the encrypted wallet private key;

obtain, via the any of at least one processor, a number of encrypted user security PIN shards sufficient to constitute the encrypted user security PIN from the subset of the plurality of PIN shard backup devices;

constitute, via the any of at least one processor, the encrypted user security PIN from the obtained encrypted user security PIN shards using the secret sharing method;

decrypt, via the any of at least one processor, the encrypted user security PIN utilizing a private key of the asymmetric keypair to determine the user security PIN; and decrypt, via the any of at least one processor, the encrypted wallet private key utilizing the user security PIN to recover the wallet private key.

43. The system of embodiment 42, in which the storage of the component collection is further structured with processor-executable instructions comprising:

provide, via the any of at least one processor, the recovered wallet private key to a requestor.

44. The system of embodiment 42, in which the storage of the component collection is further structured with processor-executable instructions comprising:

generate, via the any of at least one processor, a user security PIN interaction interface mechanism; and obtain, via the any of at least one processor, an updated user security PIN from a user via the user security PIN interaction interface mechanism.

45. The system of embodiment 44, in which the storage of the component collection is further structured with processor-executable instructions comprising:

generate, via the any of at least one processor, an updated key backup request datastructure, in which the updated key backup request datastructure is structured as specifying the recovered wallet private key, the private key backup server identifier, the PIN shard fracture scheme definition, the plurality of PIN shard backup devices, and the updated user security PIN.

46. A fracturable user security PIN based crypto wallet backup processor-implemented process, including processing processor-executable instructions via any of at least one processor from a component collection stored in at least one memory, storage of the component collection structured with processor-executable instructions comprising:

obtain, via the any of at least one processor, a key backup request datastructure, in which the key backup request datastructure is structured as specifying a wallet private key, a private key backup server identifier, a PIN shard fracture scheme definition, and a plurality of PIN shard backup devices;

obtain, via the any of at least one processor, a user security PIN;

encrypt, via the any of at least one processor, the wallet private key utilizing the user security PIN;

determine, via the any of at least one processor, a public key associated with the private key backup server identifier;

calculate, via the any of at least one processor, a symmetric key from the public key associated with the private key backup server identifier and an app private key;

encrypt, via the any of at least one processor, the encrypted wallet private key utilizing the symmetric key;

send, via the any of at least one processor, the twice encrypted wallet private key to a private key backup server corresponding to the private key backup server identifier;

generate, via the any of at least one processor, an asymmetric keypair;

encrypt, via the any of at least one processor, the user security PIN utilizing a public key of the asymmetric keypair;

generate, via the any of at least one processor, a number of encrypted user security PIN shards from the encrypted user security PIN using a secret sharing method, in which the number of encrypted user security PIN shards to generate is specified via the PIN shard fracture scheme definition; and send, via the any of at least one processor, each of the generated encrypted user security PIN shards to a corresponding PIN shard backup device from the plurality of PIN shard backup devices.

47. The process of embodiment 46, in which the PIN shard fracture scheme definition is structured as specifying an M of N fracture scheme.

48. The process of embodiment 47, in which N specifies the number of encrypted user security PIN shards to generate and M specifies how many encrypted user security PIN shards are sufficient to constitute the encrypted user security PIN.

49. The process of embodiment 46, in which a PIN shard backup device is one of: a cloud, a mobile device, a cold storage device, a hardware security module, a backup server, a trusted contact.

50. The process of embodiment 46, in which the user security PIN is obtained from a user via a user security PIN interaction interface mechanism.

51. The process of embodiment 46, in which the private key backup server is structured to be unable to decrypt the encrypted wallet private key.

52. The process of embodiment 51, in which the private key backup server is structured not to have access to the user security PIN.

53. The process of embodiment 46, in which the symmetric key is calculated via Diffie-Hellman Key-Exchange.

54. The process of embodiment 46, in which the user security PIN is encrypted via an API call to an encryption library implementing a security protocol.

55. The process of embodiment 46, in which the asymmetric keypair is an RSA keypair.

56. The process of embodiment 46, in which the secret sharing method is Shamir's secret sharing.

57. The process of embodiment 46, in which the storage of the component collection is further structured with processor-executable instructions comprising:

obtain, via the any of at least one processor, a key recovery request datastructure associated with the wallet private key, in which the key recovery request datastructure is structured as specifying a subset of the plurality of PIN shard backup devices;

obtain, via the any of at least one processor, the twice encrypted wallet private key from the private key backup server corresponding to the private key backup server identifier;

decrypt, via the any of at least one processor, the twice encrypted wallet private key utilizing the symmetric key to determine the encrypted wallet private key;

obtain, via the any of at least one processor, a number of encrypted user security PIN shards sufficient to constitute the encrypted user security PIN from the subset of the plurality of PIN shard backup devices;

constitute, via the any of at least one processor, the encrypted user security PIN from the obtained encrypted user security PIN shards using the secret sharing method;

decrypt, via the any of at least one processor, the encrypted user security PIN utilizing a private key of the asymmetric keypair to determine the user security PIN; and decrypt, via the any of at least one processor, the encrypted wallet private key utilizing the user security PIN to recover the wallet private key.

58. The process of embodiment 57, in which the storage of the component collection is further structured with processor-executable instructions comprising:

provide, via the any of at least one processor, the recovered wallet private key to a requestor.

59. The process of embodiment 57, in which the storage of the component collection is further structured with processor-executable instructions comprising:

generate, via the any of at least one processor, a user security PIN interaction interface mechanism; and obtain, via the any of at least one processor, an updated user security PIN from a user via the user security PIN interaction interface mechanism.

60. The process of embodiment 59, in which the storage of the component collection is further structured with processor-executable instructions comprising:

generate, via the any of at least one processor, an updated key backup request datastructure, in which the updated key backup request datastructure is structured as specifying the recovered wallet private key, the private key backup server identifier, the PIN shard fracture scheme definition, the plurality of PIN shard backup devices, and the updated user security PIN.

101. A fractureable secure wallet key PIN mechanism, comprising:

any of: an fractureable secure wallet key PIN apparatus, an fractureable secure wallet key PIN medium, and an fractureable secure wallet key PIN system;

in which the fractureable secure wallet key PIN apparatus includes:

at least one memory;

a component collection stored in the at least one memory;

at least one processor disposed in communication with the at least one memory, the at least one processor executing processor-executable instructions from the component collection;

in which the fractureable secure wallet key PIN medium includes:

processor-readable, non-transient medium, the medium storing a component collection;

in which the fractureable secure wallet key PIN system includes:

means to store a component collection;

means to process processor-executable instructions from the component collection;

in which a component collection storage is structured with processor-executable instructions comprising:

obtain, via at least one processor, a user's encrypted fractureable wallet encryption key, in which the encrypted fractureable wallet encryption key is structured as an encryption of a wallet encryption key based on a user secure PIN, in which the encrypted fractureable wallet encryption key is obtained via an end-to-end encrypted communications protocol, in which the encrypted fractureable wallet encryption key is obtained by an encrypted private key server for a target wallet identifier, in which the encrypted private key server is incapable of decrypting the encrypted fractureable wallet encryption key;

obtain a set of trusted shard contacts, in which the set of trusted shard contacts includes any of: user selected devices, user selected 3rd party users, first party encrypted private key shard servers, third party encrypted private key shard servers;

fracture the user secure PIN into trusted contact shards, in which trusted contact shards are structured as a broken and incomplete subportions of the user secure PIN for at least two of a chosen trusted shard contacts, which may be reconstituted into the user secure PIN upon receipt of the trusted contact shards by the user;

provide the trusted contact shards to the chosen trusted shard contacts;

obtain a key recovery request for the encrypted fractureable wallet encryption key from the user, in which the key recovery request includes indicia if the user's secure PIN is available for decryption of the encrypted fractureable wallet encryption key;

provide the encrypted fractureable wallet encryption key from the encrypted private key server when the key recovery request includes indicia that the user's secure PIN is available by the user;

provide a request for returned trusted contact shards to the chosen trusted shard contacts when the key recovery request includes indicia that the user's secure PIN is not available by the user, in which the request for returned trusted contact shards includes a target user device identifier for receipt and reconstitution of the trusted contact shards from the chosen trusted shard contacts.

102. The mechanism of embodiment 101, in which the at least two of a chosen trusted shard contacts includes any of: at least two of a chosen shard contact and at least a third of a chosen shard contact where the third chosen shard contact receives a redundant duplicate of a trusted contact shard sent to one of the two chosen trusted shard contacts.

103. The mechanism of embodiment 101, further comprising:

reconstituting the returned trusted contact shards into the user's secure PIN and decryption of the encrypted fractureable wallet encryption key on the target user's device.

104. The mechanism of embodiment 103, further comprising:

providing new PIN request to the target user's device to establish a new user secure PIN and a newly encrypted fractureable wallet encryption key based on the new user secure PIN.

105. A fractureable secure wallet key PIN process, including processing processor-executable instructions via at least one processor from a component collection stored in at least one memory, the component collection storage structured with processor-executable instructions comprising:

obtain, via at least one processor, a user's encrypted fractureable wallet encryption key, in which the encrypted fractureable wallet encryption key is structured as an encryption of a wallet encryption key based on a user secure PIN, in which the encrypted fractureable wallet encryption key is obtained via an end-to-end encrypted communications protocol, in which the encrypted fractureable wallet encryption key is obtained by an encrypted private key server for a target wallet identifier, in which the encrypted private key server is incapable of decrypting the encrypted fractureable wallet encryption key;

obtain a set of trusted shard contacts, in which the set of trusted shard contacts includes any of: user selected devices, user selected 3rd party users, first party encrypted private key shard servers, third party encrypted private key shard servers;

fracture the user secure PIN into trusted contact shards, in which trusted contact shards are structured as a broken and incomplete subportions of the user secure PIN for at least two of a chosen trusted shard contacts, which may be reconstituted into the user secure PIN upon receipt of the trusted contact shards by the user;

provide the trusted contact shards to the chosen trusted shard contacts;

obtain a key recovery request for the encrypted fractureable wallet encryption key from the user, in which the key recovery request includes indicia if the user's secure PIN is available for decryption of the encrypted fractureable wallet encryption key;

provide the encrypted fractureable wallet encryption key from the encrypted private key server when the key recovery request includes indicia that the user's secure PIN is available by the user;

provide a request for returned trusted contact shards to the chosen trusted shard contacts when the key recovery request includes indicia that the user's secure PIN is not available by the user, in which the request for returned trusted contact shards includes a target user device identifier for receipt and reconstitution of the trusted contact shards from the chosen trusted shard contacts.

106. The process of embodiment 105, in which the at least two of a chosen trusted shard contacts includes any of: at least two of a chosen shard contact and at least a third of a chosen shard contact where the third chosen shard contact receives a redundant duplicate of a trusted contact shard sent to one of the two chosen trusted shard contacts.

107. The process of embodiment 105, further comprising:

reconstituting the returned trusted contact shards into the user's secure PIN and decryption of the encrypted fractureable wallet encryption key on the target user's device.

108. The process of embodiment 107, further comprising:

providing new PIN request to the target user's device to establish a new user secure PIN and a newly encrypted fractureable wallet encryption key based on the new user secure PIN.

E2EEHWKR Controller

FIG. 8 shows a block diagram illustrating non-limiting, example embodiments of a E2EEHWKR controller. In this embodiment, the E2EEHWKR controller 801 may serve to aggregate, process, store, search, serve, identify, instruct, generate, match, and/or facilitate interactions with a computer through encryption key recovery technologies, and/or other related data.

Users, which may be people and/or other systems, may engage information technology systems (e.g., computers) to facilitate information processing. In turn, computers employ processors to process information; such processors 803 may be referred to as central processing units (CPU). One form of processor is referred to as a microprocessor. CPUs use communicative circuits to pass binary encoded signals acting as instructions to allow various operations. These instructions may be operational and/or data instructions containing and/or referencing other instructions and data in various processor accessible and operable areas of memory 829 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the E2EEHWKR controller 801 may be connected to and/or communicate with entities such as, but not limited to any of: one or more users from peripheral devices 812 (e.g., user input devices 811); an optional cryptographic processor device 828; and/or a communications network 813.

Networks comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is referred to as a "node." Networks are generally thought to facilitate the transfer of information from source points to destinations. A node specifically tasked with furthering the passage of information from a source to a destination is called a "router." There are many forms of networks such as Local Area Networks (LANs), Pico networks, Wide Area Networks (WANs), Wireless Networks (WLANs), etc. For example, the Internet is, generally, an interconnection of a multitude of networks whereby remote clients and servers may access and interoperate with one another.

The E2EEHWKR controller 801 may be based on computer systems that may comprise, but are not limited to, components such as any of: a computer systemization 802 connected to memory 829.

Computer Systemization

A computer systemization 802 may comprise a clock 830, central processing unit ("CPU(s)" and/or "processor(s)" (these terms are used interchangeably throughout the disclosure unless noted to the contrary)) 803, a memory 829 (e.g., a read only memory (ROM) 806, a random access memory (RAM) 805, etc.), and/or an interface bus 807, and most frequently, although not necessarily, are all interconnected and/or communicating through a system bus 804 on one or more (mother) board(s) 802 having conductive and/or otherwise transportive circuit pathways through which instructions (e.g., binary encoded signals) may travel to effectuate communications, operations, storage, etc. The computer systemization may be connected to a power source 886; e.g., optionally the power source may be internal. Optionally, a cryptographic processor 826 may be connected to the system bus. In another embodiment, the cryptographic processor, transceivers (e.g., ICs) 874, and/or sensor array (e.g., any of: accelerometer, altimeter, ambient light, barometer, global positioning system (GPS) (thereby allowing E2EEHWKR controller to determine its location), gyroscope, magnetometer, pedometer, proximity, ultra-violet sensor, etc.) 873 may be connected as either internal and/or external peripheral devices 812 via the interface bus I/O 808 (not pictured) and/or directly via the interface bus 807. In turn, the transceivers may be connected to antenna(s) 875, thereby effectuating wireless transmission and reception of various communication and/or sensor protocols; for example the antenna(s) may connect to various transceiver chipsets (depending on deployment needs), including any of: Broadcom® BCM4329FKUBG transceiver chip (e.g., providing 802.11n, Bluetooth® 2.1+EDR, FM, etc.); a Broadcom® BCM4752 GPS receiver with accelerometer, altimeter, GPS, gyroscope, magnetometer; a Broadcom® BCM4335 transceiver chip (e.g., providing 2G, 3G, and 4G long-term evolution (LTE) cellular communications; 802.11ac, Bluetooth® 4.0 low energy (LE) (e.g., beacon features)); a Broadcom BCM43341 transceiver chip (e.g., providing 2G, 3G and 4G LTE cellular communications; 802.11g, Bluetooth® 4.0, near field communication (NFC), FM radio); an Infineon Technologies® X-Gold 618-PMB9800 transceiver chip (e.g., providing 2G/3G HSDPA/HSUPA communications); a MediaTek® MT6620 transceiver chip (e.g., providing 802.11n (also known as WiFi® in numerous iterations), Bluetooth® 4.0 LE, FM, GPS; a Lapis Semiconductor® ML8511 UV sensor; a Maxim Integrated® MAX44000 ambient light and infrared proximity sensor; a Texas Instruments® WiLink® WL1283 transceiver chip (e.g., providing 802.11n, Bluetooth® 3.0, FM, GPS); and/or the like. The system clock may have a crystal oscillator and generates a base signal through the computer systemization's circuit pathways. The clock may be coupled to the system bus and various clock multipliers that may increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to any of: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large supercomputer(s) and mainframe(s) computers, down to mini computers, servers, desktop computers, laptops, thin clients (e.g., Chromebooks®), netbooks, tablets (e.g., Android®, iPads®, and Windows® tablets, etc.), mobile smartphones (e.g., Android®, iPhones®, Nokia®, Palm® and Windows® phones, etc.), wearable device(s) (e.g., headsets (e.g., Apple AirPods (Pro)®, glasses, goggles (e.g., Apple Vision Pro®, Google Glass®), watches, etc.), and/or the like. Often, the processors themselves may incorporate various specialized processing units, such as, but not limited to any of: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 829 beyond the processor itself; internal memory may include, but is not limited to any of: fast registers, various levels of cache memory (e.g., level 1, 2, 3, etc.), (dynamic/static) RAM, solid state memory, etc. The processor may access this memory through the use of a memory address space that is accessible via instruction address, which the processor can construct and decode allowing it to access a circuit path to a specific memory address space having a memory state. The CPU may be a microprocessor such as: AMD's® Athlon®, Duron® and/or Opteron®; Apple's® A, M, S, U series of processors (e.g., A5, A6, A7, A8 . . . M1, M2 . . . S1, S2 . . . U1 . . . , etc.); ARM's® application, embedded and secure processors; IBM® and/or Motorola's DragonBall® and PowerPC®; IBM's® and Sony's® Cell processor; Intel's® 80X86 series (e.g., 80386, 80486), Pentium®, Celeron®, Core (2) Duo®, i series (e.g., i3, i5, i7, i9, etc.), Itanium®, Xeon®, and/or XScale®; Motorola's® 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code), e.g., via load/read address commands; e.g., the CPU may read processor issuable instructions from memory (e.g., reading it from a component collection (e.g., an interpreted and/or compiled program application/library including allowing the processor to execute instructions from the application/library) stored in the memory). Such instruction passing facilitates communication within the E2EEHWKR controller and beyond through various interfaces. Should processing requirements dictate a greater amount speed and/or capacity, distributed processors (e.g., see Distributed E2EEHWKR below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the E2EEHWKR may be achieved by implementing a microcontroller such as any of: CAST's® R8051XC2 microcontroller; Diligent's® Basys 3 Artix-7, Nexys A7-100T, U192015125IT, etc.; Intel's® MCS 51 (i.e., 8051 microcontroller); and/or the like. Also, to implement certain features of the E2EEHWKR, some feature implementations may rely on embedded components, such as any of: Application-Specific Integrated Circuit ("ASIC"), Digital Signal Processing ("DSP"), Field Programmable Gate Array ("FPGA"), and/or the like embedded technology. For example, any of the E2EEHWKR component collection (distributed or otherwise) and/or features may be implemented via the microprocessor and/or via embedded components; e.g., via any of: ASIC, coprocessor, DSP, FPGA, and/or the like. Alternately, some implementations of the E2EEHWKR may be implemented with embedded components that are configured and used to achieve a variety of features or signal processing.

Depending on the particular implementation, the embedded components may include software solutions, hardware solutions, and/or some combination of both hardware/software solutions. For example, E2EEHWKR features discussed herein may be achieved through implementing FPGAs, which are a semiconductor devices containing programmable logic components called "logic blocks", and programmable interconnects, such as any of: the high performance FPGA Virtex® series, the low cost Spartan® series manufactured by Xilinx®, and/or the like. Logic blocks and interconnects can be programmed by the customer or designer, after the FPGA is manufactured, to implement any of the E2EEHWKR features. A hierarchy of programmable interconnects allow logic blocks to be interconnected as needed by the E2EEHWKR system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the E2EEHWKR may be developed on FPGAs and then migrated into a fixed version that more resembles ASIC implementations. Alternate or coordinating implementations may migrate E2EEHWKR controller features to a final ASIC instead of or in addition to FPGAs. Depending on the implementation all of the aforementioned embedded components and microprocessors may be considered the "CPU" and/or "processor" for the E2EEHWKR.

Power Source

The power source 886 may be of any various form for powering small electronic circuit board devices such as any of the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 886 is connected to at least one of the interconnected subsequent components of the E2EEHWKR thereby providing an electric current to all subsequent components. In one example, the power source 886 is connected to the system bus component 804. In an alternative embodiment, an outside power source 886 is provided through a connection across the I/O 808 interface. For example, Ethernet (with power on Ethernet), IEEE 1394, USB and/or the like connections carry both data and power across the connection and is therefore a suitable source of power.

Interface Adapters

Interface bus (ses) 807 may accept, connect, and/or communicate to a number of interface adapters, variously although not necessarily in the form of adapter cards, such as but not limited to any of: input output interfaces (I/O) 808, storage interfaces 809, network interfaces 810, and/or the like. Optionally, cryptographic processor interfaces 827 similarly may be connected to the interface bus. The interface bus provides for the communications of interface adapters with one another as well as with other components of the computer systemization. Interface adapters are adapted for a compatible interface bus. Interface adapters variously connect to the interface bus via a slot architecture. Various slot architectures may be employed, such as, but not limited to any of: Accelerated Graphics Port (AGP), Card Bus, (Extended) Industry Standard Architecture ((E) ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 809 may accept, communicate, and/or connect to a number of storage devices such as, but not limited to any of: (removable) storage devices 814, removable disc devices, and/or the like. Storage interfaces may employ connection protocols such as, but not limited to any of: (Ultra) (Serial) Advanced Technology Attachment (Packet Interface) ((Ultra) (Serial) ATA (PI)), (Enhanced) Integrated Drive Electronics ((E) IDE), Institute of Electrical and Electronics Engineers (IEEE®) 1394, fiber channel, Non-Volatile Memory (NVM) Express (NVMe), Small Computer Systems Interface (SCSI), Thunderbolt, Universal Serial Bus (USB), and/or the like.

Network interfaces 810 may accept, communicate, and/or connect to a communications network 813. Through a communications network 813, the E2EEHWKR controller is accessible through remote clients 833*b* (e.g., computers with web browsers) by users 833*a*. Network interfaces may employ connection protocols such as, but not limited to any of: direct connect, Ethernet (e.g., any of: fiber, thick, thin, twisted pair 10/100/1000/10000 Base T, and/or the like), Token Ring, wireless connection such as IEEE 802.11a-y, and/or the like. Should processing requirements dictate a greater amount speed and/or capacity, distributed network controllers (e.g., see Distributed E2EEHWKR below), architectures may similarly be employed to pool, load balance, and/or otherwise decrease/increase the communicative bandwidth required by the E2EEHWKR controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi®, Wireless Application Protocol (WAP), I-mode, and/or the like); and/or the like. A network interface may be regarded as a specialized form of an input output interface.

Further, multiple network interfaces 810 may be used to engage with various communications network types 813. For example, multiple network interfaces may be employed to allow for the communication over broadcast, multicast, and/or unicast networks.

Input Output interfaces (I/O) 808 may accept, communicate, and/or connect to any of: user, peripheral devices 812 (e.g., input devices 811), cryptographic processor devices 828, and/or the like. I/O may employ connection protocols such as, but not limited to any of: audio: analog, digital, monaural, RCA, stereo, and/or the like; data: Apple Desktop Bus (ADB)®, IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, Thunderbolt®/USB-C, VGA, and/or the like; wireless transceivers: 802.11a-y; Bluetooth®; cellular (e.g., code division multiple access (CDMA), high speed packet access (HSPA (+)), high-speed downlink packet access (HSDPA), global system for mobile communications (GSM), long term evolution (LTE), WiMax®, etc.); and/or the like. One output device may include a video display, which may comprise a Cathode Ray Tube (CRT), Liquid Crystal Display (LCD), Light-Emitting Diode (LED), Organic Light-Emitting Diode (OLED), and/or the like based monitor with an interface (e.g., HDMI circuitry and cable) that accepts signals from a video interface, may be used. The video interface composites information generated by a computer systemization and generates video signals based on the composited information in a video memory frame. Another output device is a television set, which accepts signals from a video interface. The video interface provides the composited video information through a video connection interface that accepts a video display interface (e.g., an RCA composite video connector accepting an RCA composite video cable; a DVI connector accepting a DVI display cable, etc.).

Peripheral devices 812 may be connected and/or communicate to I/O and/or other facilities of the like such as any of: network interfaces, storage interfaces, directly to the interface bus, system bus, the CPU, and/or the like. Peripheral devices may be external, internal and/or part of the E2EEHWKR controller. Peripheral devices may include any of: antenna, audio devices (e.g., line-in, line-out, microphone input, speakers, etc.), cameras (e.g., gesture (e.g., Microsoft Kinect®) detection, motion detection, still, video, webcam, etc.), dongles (e.g., for copy protection ensuring secure transactions with a digital signature, as connection/format adaptors, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 811 often are a type of peripheral device 512 (see above) and may include any of: accelerometers, camaras, card readers, dongles, finger print readers, gloves, graphics tablets, joysticks, keyboards, microphones, mouse (mice), remote controls, security/biometric devices (e.g., facial identifiers, fingerprint reader, iris reader, retina reader, etc.), styluses, touch screens (e.g., capacitive, resistive, etc.), trackballs, trackpads, watches, and/or the like.

It should be noted that although user input devices and peripheral devices may be employed, the E2EEHWKR controller may be embodied as an embedded, dedicated, and/or monitor-less (i.e., headless) device, and access may be provided over a network interface connection.

Cryptographic units such as, but not limited to any of: microcontrollers, processors 826, interfaces 827, and/or devices 828 may be attached, and/or communicate with the E2EEHWKR controller. A MC68HC16 microcontroller, manufactured by Motorola, Inc.®, may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other specialized cryptographic processors include any of: Broadcom's® CryptoNetX and other Security Processors; nCipher's® nShield; SafeNet's® Luna PCI (e.g., 7100) series; Semaphore Communications'® 40 MHz Roadrunner 184; Sun's® Cryptographic Accelerators (e.g., Accelerator 6000 PCIe Board, Accelerator 500 Daughtercard); Via Nano® Processor (e.g., L2100, L2200, U2400) line, which is capable of performing 500+MB/s of cryptographic instructions; VLSI Technology's® 33 MHz 6868; and/or the like.

Memory

Generally, any mechanization and/or embodiment allowing a processor to affect the storage and/or retrieval of information is regarded as memory 829. The storing of information in memory may result in a physical alteration of the memory to have a different physical state that makes the memory a (e.g., physical) structure with a unique encoding of the memory stored therein. While memory is often physical and/or non-transitory, short term transitory memories may also be employed in various contexts, e.g., network communication may also be employed to send data as signals acting as transitory as well, for applications not requiring more long-term storage. Often, memory is a fungible technology and resource, thus, any number of memory embodiments may be employed in lieu of or in concert with one another. It is to be understood that the E2EEHWKR controller and/or a computer systemization may employ various forms of memory 829. For example, a computer systemization may be configured to have the operation of on-chip CPU memory (e.g., registers), RAM, ROM, and any other storage devices performed by a paper punch tape or paper punch card mechanism; however, such an embodiment would result in an extremely slow rate of operation. In one configuration, memory 829 may include ROM 806, RAM 805, and a storage device 814. A storage device 814 may be any various computer system storage. Storage devices may include: an array of devices (e.g., Redundant Array of Independent Disks (RAID)); a cache memory, a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RAM drives; register memory (e.g., in a CPU), solid state memory devices (e.g., USB memory, solid state drives (SSD), etc.); other processor-readable storage mediums; and/or other devices of the like. Thus, a computer systemization generally employs and makes use of memory.

Component Collection

The memory 829 may contain a collection of processor-executable application/library/program and/or database components (e.g., including processor-executable instructions) and/or data such as, but not limited to any of: operating system component(s) 815 (operating system); information server component(s) 816 (information server); user interface component(s) 817 (user interface); Web browser component(s) 818 (Web browser); database(s) 819; mail server component(s) 821; mail client component(s) 822; cryptographic server component(s) 820 (cryptographic server); machine learning component 823; distributed immutable ledger component 824; the E2EEHWKR component(s) 835 (e.g., which may include AKB, AKR 841-842, and/or the like components); and/or the like (i.e., collectively referred to throughout as a "component collection"). These components may be stored and accessed from the storage devices and/or from storage devices accessible through an interface bus. Although unconventional program components such as those in the component collection may be stored in a local storage device 814, they may also be loaded and/or stored in memory such as: cache, peripheral devices, processor registers, RAM, remote storage facilities through a communications network, ROM, various forms of memory, and/or the like.

Operating System

The operating system component 815 is an executable program component facilitating the operation of the E2EEHWKR controller. The operating system may facilitate access to any of: I/O, network interfaces, peripheral devices, storage devices, and/or the like. The operating system may be a highly fault tolerant, scalable, and secure system such as any of: Apple's Macintosh OS X® (Server) and macOS®; AT&TR Plan 9; Be OS®; Blackberry's QNX®; Google's Chrome®; Microsoft's Windows® Jul. 8, 2010; Unix and Unix-like system distributions (such as AT&T's® UNIX®; Berkley Software Distribution (BSD)® variations such as FreeBSD®, NetBSD®, OpenBSD®, and/or the like; Linux® distributions such as Red Hat®, Ubuntu®, and/or the like); and/or the like operating systems. However, more limited and/or less secure operating systems also may be employed such as any of: Apple Macintosh OS® (i.e., versions 1-9), IBM OS/2®, Microsoft DOS®, Microsoft Windows® 2000/2003/3.1/95/98/CE/Millennium/Mobile/NT/Vista/XP/7/X (Server)®, Palm OS®, and/or the like. Additionally, for robust mobile deployment applications, mobile operating systems may be used, such as any of: Apple's iOS®; China Operating System COS®; Google's Android®; Microsoft® Windows® RT/Phone®; Palm's WebOS®; Samsung®/Intel's Tizen®; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may facilitate the interaction with any of: communications networks, data, I/O, peripheral devices, program components, memory, user input devices, and/or the like. The operating system may provide communications protocols that allow the E2EEHWKR controller to communicate with other entities through a communications network 813. Various communication protocols may be used by the E2EEHWKR controller as a subcarrier transport mechanism for interaction, such as, but not limited to any of: multicast, TCP/IP, UDP, unicast, and/or the like.

Information Server

An information server component 816 is a stored program component that is executed by a CPU. The information server may be an Internet information server such as, but not limited to any of: Apache Software Foundation's Apache®, Microsoft's Internet Information Server®, and/or the like. The information server may allow for the execution of program components through facilities such as any of: Active Server Page (ASP), ActiveX, (ANSI) (Objective-) C (++), C# and/or .NET®, Common Gateway Interface (CGI) scripts, dynamic (D) hypertext markup language (HTML), FLASH®, Java®, JavaScript®, Practical Extraction Report Language (PERL)®, Hypertext Pre-Processor (PHP), pipes, Python®, Ruby, wireless application protocol (WAP), WebObjects®, and/or the like. The information server may support secure communications protocols such as, but not limited to any of: File Transfer Protocol (FTP(S)); HyperText Transfer Protocol (HTTP); Secure Hypertext Transfer Protocol (HTTPS), Secure Socket Layer (SSL) Transport Layer Security (TLS), messaging protocols (e.g., America Online (AOL®) Instant Messenger (AIM)®, Application Exchange (APEX), ICQ, Internet Relay Chat (IRC), Microsoft Network (MSN) Messenger® Service, Presence and Instant Messaging Protocol (PRIM), Internet Engineering Task Force's® (IETF's) Session Initiation Protocol (SIP), SIP for Instant Messaging and Presence Leveraging Extensions (SIMPLE), Slack®, open XML-based Extensible Messaging and Presence Protocol (XMPP) (i.e., Jabber® or Open Mobile Alliance's (OMA's) Instant Messaging and Presence Service (IMPS)), Yahoo! Instant Messenger® Service, and/or the like). The information server may provide results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the E2EEHWKR controller based on the remainder of the HTTP request. For example, a request such as http://followed by the address, e.g., 123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with any of: the E2EEHWKR database 819, operating systems, other program components, user interfaces, Web browsers, and/or the like.

Access to the E2EEHWKR database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the E2EEHWKR. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in SQL by instantiating a search string with the proper join/select commands based on the tagged text entries, and the resulting command is provided over the bridge mechanism to the E2EEHWKR as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as buttons, check boxes, cursors, graphical views, menus, scrollers, text fields, and windows (collectively referred to as widgets) similarly facilitate the access, capabilities, operation, and display of data and computer hardware and operating system resources, and status. Operation interfaces are called user interfaces. Graphical user interfaces (GUIs) such as the Apple's iOS®, Macintosh Operating System's Aqua®; IBM's OS/2®; Google's Chrome® (e.g., and other webbrowser/cloud based client OSs); Microsoft's Windows® 2000/2003/3.1/95/98/CE/Millennium/Mobile/NT/Vista/XP/7/X (Server)® (i.e., Aero, Surface, etc.); Unix's X-Windows (e.g., which may include additional Unix graphic interface libraries and layers such as K Desktop Environment (KDE)®, mythTV and GNU Network Object Model Environment (GNOME))®, web interface libraries (e.g., ActiveX®, AJAX, (D) HTML, FLASH®, Java®, JavaScript®, etc. interface libraries such as, but not limited to any of: Dojo, jQuery (UI), MooTools, Prototype, script.aculo.us, SWFObject, Yahoo! User Interface®, and/or the like, any of which may be used and) provide a baseline and mechanism of accessing and displaying information graphically to users.

A user interface component 817 is a stored program component that is executed by a CPU. The user interface may be a graphic user interface as provided by, with, and/or atop operating systems and/or operating environments, and may provide executable library APIs (as may operating systems and the numerous other components noted in the component collection) that allow instruction calls to generate user interface elements such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 818 is a stored program component that is executed by a CPU. The Web browser may be a hypertext viewing application such as any of: Apple's (mobile) Safari®, Brave Software, Inc.'s Brave Browser (including Virtual Private Network (VPN) features), Google's Chrome®, Microsoft Edge®, Microsoft Internet Explorer®, Mozilla's Firefox®, Netscape Navigator®, The Tor Project, Inc,'s Tor Browser® (including VPN features), and/or the like. Secure Web browsing may be supplied with 128 bit (or greater) encryption by way of HTTPS, SSL, and/or the like. Web browsers allowing for the execution of program components through facilities such as any of: ActiveX®, AJAX, (D) HTML, FLASH®, Java®, JavaScript®, web browser plug-in APIs (e.g., FireFox®, Safari® Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with any of: information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the E2EEHWKR enabled nodes. The combined application may be nugatory on systems employing Web browsers.

Mail Server

A mail server component 821 is a stored program component that is executed by a CPU 803. The mail server may be an Internet mail server such as, but not limited to any of: dovecot, Courier IMAP, Cyrus IMAP, Maildir, Microsoft Exchange®, sendmail, and/or the like. The mail server may allow for the execution of program components through facilities such as any of: ASP, ActiveX®, (ANSI) (Objective-) C (++), C# and/or .NET, CGI scripts, Java®, JavaScript®, PERL®, PHP, pipes, Python®, WebObjects®, and/or the like. The mail server may support communications protocols such as, but not limited to any of: Internet message access protocol (IMAP), Messaging Application Programming Interface (MAPI)/Microsoft Exchange®, post office protocol (POP3), simple mail transfer protocol (SMTP), and/or the like. The mail server can route, forward, and process incoming and outgoing mail messages that have been sent, relayed and/or otherwise traversing through and/or to the E2EEHWKR. Alternatively, the mail server component may be distributed out to mail service providing entities such as Google's® cloud services (e.g., Gmail® and notifications may alternatively be provided via messenger services such as AOL's Instant Messenger®, Apple's iMessage®, Google Messenger®, SnapChat®, etc.).

Access to the E2EEHWKR mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 822 is a stored program component that is executed by a CPU 803. The mail client may be a mail viewing application such as any of: Apple Mail®, Microsoft Entourage®, Microsoft Outlook®, Microsoft Outlook Express®, Mozilla®, Thunderbird®, and/or the like. Mail clients may support a number of transfer protocols, such as any of: IMAP, Microsoft Exchange®, POP3, SMTP, and/or the like. A mail client may communicate to and/or with other components in a component collection, including itself, and/or facilities of the like. Most frequently, the mail client communicates with ay of: mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 820 is a stored program component that is executed by any of: a CPU 803, cryptographic processor 826, cryptographic processor interface 827, cryptographic processor device 828, and/or the like. Cryptographic processor interfaces may allow for expedition of encryption and/or decryption requests by the cryptographic component; however, the cryptographic component, alternatively, may run on a CPU and/or GPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to any of: digital certificates (e.g., X.509 authentication framework), digital signatures, dual signatures, enveloping, password access protection, public key management, and/or the like. The cryptographic component facilitates numerous (encryption and/or decryption) security protocols such as, but not limited to any of: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the E2EEHWKR may encrypt all incoming and/or outgoing communications and may serve as node within a virtual private network (VPN) with a wider communications network. The cryptographic component facilitates the process of "security authorization" whereby access to a resource is inhibited by a security protocol and the cryptographic component effects authorized access to the secured resource. In addition, the cryptographic component may provide unique identifiers of content, e.g., employing an MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to allow the E2EEHWKR component to engage in secure transactions if so desired. The cryptographic component facilitates the secure accessing of resources on the E2EEHWKR and facilitates the access of secured resources on remote systems; i.e., it may act as a client and/or server of secured resources. Most frequently, the cryptographic component communicates with any of: information servers, operating systems, other program components, and/or the like. The cryptographic component may contain, communicate, generate, obtain, and/or provide program component, system, user, and/or data communications, requests, and/or responses.

Machine Learning (ML)

In one non limiting embodiment, the E2EEHWKR includes a machine learning component 823, which may be a stored program component that is executed by a CPU 803. The machine learning component, alternatively, may run on any of: a set of specialized processors, ASICs, FPGAs, GPUs, and/or the like. The machine learning component may be deployed to execute serially, in parallel, distributed, and/or the like, such as by utilizing cloud computing. The machine learning component may employ an ML platform such as any of: Amazon SageMaker, Azure® Machine Learning, DataRobot AI Cloud, Google AI Platform, IBM Watson® Studio, and/or the like. The machine learning component may be implemented using any of: an ML framework such as any of: PyTorch, Apache MXNet, MathWorks Deep Learning Toolbox, scikit-learn, TensorFlow, XGBoost, and/or the like. The machine learning component facilitates training and/or testing of ML prediction logic data structures (e.g., models) and/or utilizing ML prediction logic data structures (e.g., models) to output ML predictions by the E2EEHWKR. The machine learning component may employ various artificial intelligence and/or learning mechanisms such as any of: Reinforcement Learning, Supervised Learning, Unsupervised Learning, and/or the like. The machine learning component may employ ML prediction logic data structure (e.g., model) types such as any of: Bayesian Networks, Classification prediction logic data structures (e.g., models), Decision Trees, Neural Networks (NNs), Regression prediction logic data structures (e.g., models), and/or the like.

Distributed Immutable Ledger (DIL)

In one non limiting embodiment, the E2EEHWKR includes a distributed immutable ledger component 824, which may be a stored program component that is executed by a CPU 803. The distributed immutable ledger component, alternatively, may run on any of: a set of specialized processors, ASICs, FPGAs, GPUs, and/or the like. The distributed immutable ledger component may be deployed to execute as any of: serially, in parallel, distributed, and/or the like, such as by utilizing a peer-to-peer network. The distributed immutable ledger component may be implemented as a blockchain (e.g., public blockchain, private blockchain, hybrid blockchain) that comprises cryptographically linked records (e.g., blocks). The distributed immutable ledger component may employ a platform such as any of: Bitcoin, Bitcoin Cash, Dogecoin, Ethereum, Litecoin, Monero, Zcash, and/or the like. The distributed immutable ledger component may employ a consensus mechanism such as any of: proof of authority, proof of space, proof of stake, proof of work, and/or the like. The distributed immutable ledger component may be used to provide mechanisms such as any of: data storage, cryptocurrency, inventory tracking, non-fungible tokens (NFTs), smart contracts, and/or the like.

The E2EEHWKR Database

The E2EEHWKR database component 819 may be embodied in a database and its stored data. The database is a stored program component, which is executed by the CPU; the stored program component portion configuring the CPU to process the stored data. The database may be a fault tolerant, relational, scalable, secure database such as any of: Claris FileMaker®, MySQL®, Oracle®, Sybase®, etc. may be used. Additionally, optimized fast memory and distributed databases such as any of: IBM's Netezza®, MongoDB's MongoDB®, opensource Hadoop®, opensource VoltDB, SAP's Hana®, etc. Relational databases are an extension of a flat file. Relational databases include a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the E2EEHWKR database may be implemented using various other data-structures, such as any of: an array, hash, (linked) list, struct, structured text file (e.g., JSON, XML, and/or the like), table, flat file database, and/or the like. Such data-structures may be stored in memory and/or in (structured) files. In another alternative, an object-oriented database may be used, such as any of: Frontier™, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the E2EEHWKR database is implemented as a data-structure, the use of the E2EEHWKR database 819 may be integrated into another component such as the E2EEHWKR component 835. Also, the database may be implemented as a mix of data structures, objects, programs, relational structures, scripts, and/or the like. Databases may be consolidated and/or distributed in countless variations (e.g., see Distributed E2EEHWKR below). Portions of databases, e.g., tables, may be exported and/or imported and thus decentralized and/or integrated.

In another embodiment, the database component (and/or other storage mechanism of the E2EEHWKR) may store data immutably so that tampering with the data becomes physically impossible and the fidelity and security of the data may be assured. In some embodiments, the database may be stored to write only or write once, read many (WORM) mediums. In another embodiment, the data may be stored on distributed ledger systems (e.g., via blockchain) so that any tampering to entries would be readily identifiable. In one embodiment, the database component may employ the distributed immutable ledger component DIL 824 mechanism.

In one embodiment, the database component 819 includes several tables representative of the schema, tables, structures, keys, entities and relationships of the described database 819*a-z:*

An accounts table 819*a* includes fields such as, but not limited to any of: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccaountRatio, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table 819*b* includes fields such as, but not limited to any of: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, reputationScore, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a E2EEHWKR);

An devices table 819*c* includes fields such as, but not limited to any of: deviceID, sensorIDs, accountID, assetIDs, paymentIDs, deviceType, deviceName, deviceManufacturer, deviceModel, device Version, deviceSerialNo, deviceIPaddress, deviceMACaddress, device ECID, deviceUUID, deviceLocation,deviceCertificate, deviceOS, appIDs, deviceSecureKey, walletAppInstalledFlag, deviceResources, deviceSession, authKey, deviceAccessPrivileges, devicePreferences, deviceRestrictions, hardware_config, software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power percentage, power_condition, temperature_setting, speed_adjust, hold_duration, part_actuation, and/or the like. Device table may, in some embodiments, include fields corresponding to one or more Bluetooth® profiles, such as those published at www.bluetooth.org/en-us/specification/adopted-specifications, and/or other device specifications, and/or the like;

An apps table 819*d* includes fields such as, but not limited to any of: appID, appName, appType, appDependencies, accountID, deviceIDs, transactionID, userID, appStoreAuthKey, appStoreAccountID, appStoreIPaddress, appStoreURLaccessCode, appStorePortNo, app AccessPrivileges, appPreferences, appRestrictions, portNum, access_API_call, linked_wallets_list, and/or the like;

An assets table 819*e* includes fields such as, but not limited to any of: assetID, accountID, userID, distributorAccountID, distributorPaymentID, distributorOnwerID, assetOwnerID, assetType, assetSourceDeviceID, assetSourceDeviceType, assetSourceDeviceName, assetSourceDistributionChannelID, assetSourceDistributionChannelType, assetSourceDistributionChannelName, assetTargetChannelID, assetTargetChannelType, assetTargetChannelName, assetName, assetSeriesName, assetSeriesSeason, assetSeriesEpisode, assetCode, assetQuantity, assetCost, assetPrice, assetValue, assetManufactuer, assetModelNo, assetSerialNo, assetLocation, assetAddress, assetState, assetZ- IPcode, assetState, assetCountry, assetEmail, assetGarbageCollected, assetIPaddress, assetURLaccessCode, assetOwnerAccountID, subscriptionIDs, assetAuthroizationCode, assetAccessPrivileges, assetPreferences, assetRestrictions, assetAPI, assetAPIconnectionAddress, and/or the like;

A payments table **819*f*** includes fields such as, but not limited to any of: paymentID, accountID, userID, couponID, coupon Value, couponConditions, couponExpiration, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentAccessPrivileges, paymentPreferences, paymentURLaccessCode, paymentPortNo, payementRestrictions, and/or the like;

An transactions table **819*g*** includes fields such as, but not limited to any of: transactionID, accountID, assetIDs, deviceIDs, paymentIDs, transactionIDs, userID, merchantID, transactionType, transactionDate, transactionTime, transactionAmount, transactionQuantity, transactionDetails, productsList, productType, productTitle, productsSummary, productParamsList, transactionNo, transactionAccessPrivileges, transactionPreferences, transactionRestrictions, merchantAuthKey, merchantAuthCode, and/or the like;

An merchants table **819*h*** includes fields such as, but not limited to any of: merchantID, merchantTaxID, merchanteName, merchantContactUserID, accountID, issuerID, acquirerID, merchantEmail, merchantAddress, merchantState, merchantZIPcode, merchantCountry, merchantAuthKey, merchantIPaddress, portNum, merchantURLaccessCode, merchantPortNo, merchantAccessPrivileges, merchantPreferences, merchantRestrictions, and/or the like;

An ads table **819*i*** includes fields such as, but not limited to any of: adID, advertiserID, adMerchantID, adNetworkID, adName, adTags, advertiserName, adSponsor, adTime, adGeo, adAttributes, adFormat, adProduct, adText, adMedia, adMediaID, adChannelID, adTagTime, adAudioSignature, adHash, adTemplateID, adTemplateData, adSourceID, adSourceName, adSourceServerIP, adSourceURL, adSourceSecurityProtocol, adSourceFTP, adAuthKey, adAccessPrivileges, adPreferences, adRestrictions, adNetworkXchangeID, adNetworkXchangeName, adNetworkXchangeCost, adNetworkXchangeMetricType (e.g., CPA, CPC, CPM, CTR, etc.), adNetworkXchangeMetricValue, adNetworkXchangeServer, adNetworkXchangePortNumber, publisherID, publisherAddress, publisherURL, publisherTag, publisherIndustry, publisherName, publisherDescription, siteDomain, siteURL, siteContent, siteTag, siteContext, siteImpression, site Visits, siteHeadline, sitePage, siteAdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID, merchantID, deviceID, userID, accountID, impressionID, impressionOS, impressionTimeStamp, impressionGeo, impressionAction, impressionType, impressionPublisherID, impressionPublisherURL, and/or the like;

An ML table **819*j*** includes fields such as, but not limited to any of: MLID, predictionLogicStructureID, predictionLogicStructureType, predictionLogicStructureConfiguration, predictionLogicStructureTrainedStructure, predictionLogicStructure TrainingData, predictionLogicStructure TrainingDataConfiguration, predictionLogicStructureTestingData, predictionLogicStructureTestingDataConfiguration, predictionLogicStructureOutputData, predictionLogicStructureOutputDataConfiguration, and/or the like;

A market_data table **819*z* includes fields such as, but not limited to any of: market_data_feed_ID, asset_ID, asset_symbol, asset_name, spot price, bid_price, ask_price, and/or the like; in one embodiment, the market data table is populated through a market data feed (e.g., Bloomberg's PhatPipe®, Consolidated Quote System® (CQS), Consolidated Tape Association® (CTA), Consolidated Tape System® (CTS), Dun & Bradstreet®, OTC Montage Data Feed® (OMDF), Reuter's Tib®, Triarch®, US equity trade and quote market Data®, Unlisted Trading Privileges® (UTP) Trade Data Feed® (UTDF), UTP Quotation Data Feed® (UQDF), and/or the like feeds, e.g., via ITC 2.1** and/or respective feed protocols), for example, through Microsoft's® Active Template Library and Dealing Object Technology's real-time toolkit Rtt.Multi.

In one embodiment, the E2EEHWKR database may interact with other database systems. For example, employing a distributed database system, queries and data access by search E2EEHWKR component may treat the combination of the E2EEHWKR database, an integrated data security layer database as a single database entity (e.g., see Distributed E2EEHWKR below).

In one embodiment, user programs may contain various user interface primitives, which may serve to update the E2EEHWKR. Also, various accounts may require custom database tables depending upon the environments and the types of clients the E2EEHWKR may need to serve. It should be noted that any unique fields may be designated as a key field throughout. In an alternative embodiment, these tables have been decentralized into their own databases and their respective database controllers (i.e., individual database controllers for each of the above tables). The E2EEHWKR may also be configured to distribute the databases over several computer systemizations and/or storage devices. Similarly, configurations of the decentralized database controllers may be varied by consolidating and/or distributing the various database components **819*a-z***. The E2EEHWKR may be configured to keep track of various settings, inputs, and parameters via database controllers.

The E2EEHWKR database may communicate to and/or with other components in a component collection, including itself, and/or facilities of the like. Most frequently, the E2EEHWKR database communicates with any of: the E2EEHWKR component, other program components, and/or the like. The database may contain, retain, and provide information regarding other nodes and data.

The E2EEHWKRs

The E2EEHWKR component 835 is a stored program component that is executed by a CPU via stored instruction code configured to engage signals across conductive pathways of the CPU and ISICI controller components. In one embodiment, the E2EEHWKR component incorporates any and/or all combinations of the aspects of the E2EEHWKR that were discussed in the previous figures. As such, the E2EEHWKR affects accessing, obtaining and the provision of information, services, transactions, and/or the like across various communications networks. The features and embodiments of the E2EEHWKR discussed herein increase network efficiency by reducing data transfer requirements with the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., may reduce the capacity and structural infrastructure requirements to support the E2EEHWKR's features and facilities, and in many cases reduce the costs, energy consumption/requirements, and extend the life of E2EEHWKR's underlying infrastructure; this has the added benefit of making the E2EEHWKR more reliable. Similarly, many of the features and mechanisms are designed to be easier for users to use and access, thereby broadening the audience that may enjoy/employ and exploit the feature sets of the E2EEHWKR; such ease of use also helps to increase the reliability of the E2EEHWKR. In addition, the feature sets include heightened security as noted via the Cryptographic components 820, 826, 828 and throughout, making access to the features and data more reliable and secure The E2EEHWKR transforms key backup request, key recovery request datastructure/inputs, via E2EEHWKR components (e.g., AKB, AKR), into key backup response, key recovery response outputs.

The E2EEHWKR component facilitates access of information between nodes may be developed by employing various development tools and languages such as, but not limited to any of: Apache® components, Assembly, ActiveX, binary executables, (ANSI) (Objective-) C (++), C# and/or .NET®, database adapters, CGI scripts, Java®, JavaScript®, mapping tools, procedural and object oriented development tools, PERL®, PHP, Python®, Ruby, shell scripts, SQL commands, web application server extensions, web development environments and libraries (e.g., Microsoft's® ActiveX®; Adobe AIR®, FLEX & FLASH®; AJAX; (D) HTML; Dojo, Java®; JavaScript®; jQuery (UI); MooTools; Prototype; script.aculo.us; Simple Object Access Protocol (SOAP); SWFObject; Yahoo!® User Interface; and/or the like), WebObjects®, and/or the like. In one embodiment, the E2EEHWKR server employs a cryptographic server to encrypt and decrypt communications. The E2EEHWKR component may communicate to and/or with other components in a component collection, including itself, and/or facilities of the like. Most frequently, the E2EEHWKR component communicates with any of: the E2EEHWKR database, operating systems, other program components, and/or the like. The E2EEHWKR may contain, communicate, generate, obtain, and/or provide program component, system, user, and/or data communications, requests, and/or responses.

Distributed E2EEHWKRs

The structure and/or operation of any of the E2EEHWKR node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such, a combination of hardware may be distributed within a location, within a region and/or globally where logical access to a controller may be abstracted as a singular node, yet where a multitude of private, semiprivate and publicly accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access, etc.).

Thus, E2EEHWKR may be implemented with varying functional, logical, operational, organizational, structural and/or topological modifications may be made without departing from the scope and/or spirit of the disclosure. For example, unless expressly described otherwise, it is to be understood that the logical and/or topological structure of any combination of any program components (e.g., of the component collection), other components, data flow order, logic flow order, and/or any present feature sets as described in the figures and/or throughout are not limited to a fixed operating order and/or arrangement, but rather, any disclosed order is exemplary (e.g., such description may be presented as such for ease of description and understanding of disclosed principles) and all equivalents, and the components may execute at the same or different processors and in varying orders. Furthermore, it is to be understood that such features are not limited to serial execution (e.g., such description may be presented as such for ease of description and understanding of disclosed principles), but rather, any number of threads, processes, services, servers, and/or the like that may execute asymmetrically, asynchronously, batch, concurrently, delayed, dynamically, in parallel, on-demand, periodically, real-time, symmetrically, simultaneously, synchronously, triggered, and/or the like may take place depending on how the components and even individual methods and/or functions are called. For example, in any of the dataflow and/or logic flow descriptions, any individual item and/or method and/or function called may only execute serially and/or asynchronously in a small deployment on a single core machine, but may be executed concurrently, in parallel, simultaneously, synchronously (as well as asynchronously yet still concurrent, in parallel, and/or simultaneously) when deployed on multicore processors or even across multiple machines and in and from multiple machines and geographic regions.

As such, the component collection may be consolidated and/or distributed in countless variations through various data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so as discussed through the disclosure and/or through various other data processing communication techniques. Furthermore, any part or sub parts of the E2EEHWKR node controller's component collection (and/or any constituent processing instructions) may be executed on at least one processing unit, where that processing unit may be a sub-unit of a CPU, a core, an entirely different CPU and/or sub-unit at the same location or remotely at a different location, and/or across many multiple such processing units. For example, for load-balancing reasons, parts of the component collection may start to execute on a given CPU core, then the next instruction/execution element of the component collection may (e.g., be moved to) execute on another CPU core, on the same, or completely different CPU at the same or different location, e.g., because the CPU may become over taxed with instruction executions, and as such, a scheduler may move instructions at the taxed CPU and/or CPU sub-unit to another CPU and/or CPU sub-unit with a lesser instruction execution load. In another embodiment, processing may take place on hosted virtual machines such as on Amazon® Data/Web Services (AWS)® where virtual machines literally do not even exist while E2EEHWKR is executing, and as processing demands increase, such additional virtual machines may be spun up and instantiated as necessary and created on-the-fly to increase processing throughput (e.g., by distributing processing of E2EEHWKR component collection processor instructions), and conversely, virtual machines may be spun down and cease to exist as processing demands decrease; these virtual machines may be spun up/down on the same, or in completely remote and physically separate facilities and hardware. As such, it may be difficult and/or impossible to predict on which CPU, processing sub-unit, and/or virtual machine a process instruction begins execution and where it will continue and/or conclude execution, as it may be on the same and/or completely different CPU, processing sub-unit, virtual machine, and/or the like.

The configuration of the E2EEHWKR controller may depend on the context of system deployment. Factors such as, but not limited to any of: the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to any of: data referencing (e.g., pointers), internal messaging, object instance variable communication, shared memory space, variable passing, and/or the like. For example, cloud services such as any of: Amazon Data/Web Services®, Microsoft Azure®, Hewlett Packard Helion®, IBM® Cloud services allow for E2EEHWKR controller and/or E2EEHWKR component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to any of: Application Program Interfaces (API) information passage; (distributed) Component Object Model ((D) COM), (Distributed) Object Linking and Embedding ((D) OLE), and/or the like), Common Object Request Broker Architecture (CORBA), Jini local and remote application program interfaces, JavaScript Object Notation (JSON)®, NeXT Computer, Inc.'s® (Dynamic) Object Linking, Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as any of: JSON, lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to any of: character (e.g., tab) delineated text, HTML, JSON, structured text streams, XML, and/or the like structured data. In another embodiment, inter-application data processing protocols themselves may have integrated parsers (e.g., JSON, SOAP, and/or like parsers) that may be employed to parse (e.g., communications) data. Further, the parsing grammar may be used beyond message parsing, but may also be used to parse any of: databases, data collections, data stores, structured data, and/or the like. Again, the desired configuration may depend upon the context, environment, and requirements of system deployment.

For example, in some implementations, the E2EEHWKR controller may be executing a PHP script implementing a Secure Sockets Layer ("SSL") socket server via the information server, which it listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via an SSL connection, parse the data to extract variables, and store the data to a database, is provided below:

```
<?PHP
header('Content-Type: text/plain');
// set ip address and port to listen to for incoming data
$address = '192. 168.0. 100';
$port = 255;
// create a server-side SSL socket, listen for/accept incoming communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of message
```

-continued

```
do {
  $input = "";
  $input = socket_read($client, 1024);
  $data .= $input;
} while($input != "");
// parse data to extract variables
$obj = json_decode($data, true);
// store input data in a database
mysql_connect ("201.408.185.132",$DBserver,$password); // access database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

www.xav.com/perl/site/lib/SOAP/Parser.html publib.boulder.ibm.com/infocenter/tivihelp/v2r1/index.jsp?topic=/com.ibm. IBMDI.doc/referenceguide295.htm and other parser implementations:

publib.boulder.ibm.com/infocenter/tivihelp/v2r1/index.jsp?topic=/com.ibm. IBMDI.doc/referenceguide259.htm all of which are hereby expressly incorporated by reference.

In order to address various issues and advance the art, the entirety of this application for End-to-End Encryption and Hot Wallet Key Recovery Apparatuses, Processes and Systems (including the Cover Page, Title, Headings, Field, Background, Summary, Brief Description of the Drawings, Detailed Description, Claims, Abstract, Figures, Appendices, and otherwise) shows, by way of illustration, various non-limiting example embodiments in which the claimed innovations may be practiced. The advantages and features described in the application are of a representative sample of embodiments only, and are not exhaustive and/or exclusive. They are presented to assist in understanding and teach the claimed principles. It should be noted that to the extent any financial and/or investment examples are included, such examples are for illustrative purpose(s) only, and are not, nor should they be interpreted, as investment advice. As such, all examples and/or embodiments are deemed to be non-limiting throughout this disclosure; it should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It may be appreciated that many of those undescribed embodiments incorporate and/or be based of same principles of the innovations and others are equivalent. As such, no inference should be drawn regarding those embodiments discussed herein relative to those not discussed herein other than it is as such for purposes of reducing space and repetition. Consequently, terms such as "lower", "upper", "horizontal", "vertical", "above", "below", "up", "down", "top" and "bottom" as well as derivatives thereof (e.g., "horizontally", "downwardly", "upwardly", etc.) should not be construed to limit embodiments, and instead, again, are offered for convenience of description of orientation and/or convenience of reference, and as such, do not require that any embodiments be constructed or operated in a particular orientation unless explicitly indicated as such. Terms such as "attached", "affixed", "connected", "coupled", "interconnected", etc. may refer to a relationship where structures are secured or attached to one another either directly or indirectly through intervening structures, as well as both movable or rigid attachments or relationships, unless expressly described otherwise. Similarly, descriptions of embodiments disclosed throughout this disclosure, any reference to direction or orientation is merely intended for convenience of description and/or of reference and is not intended in any way to limit the scope of described embodiments. Furthermore, it is to be understood, unless expressly described otherwise, that other embodiments may be utilized and functional, logical, operational, organizational, structural and/or topological modifications may be made without departing from the scope and/or spirit of the disclosure. For instance, unless expressly described otherwise, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Also, it is to be understood, unless expressly described otherwise, that such features are not limited to serial execution, but rather, any number of threads, processes, services, servers, and/or the like that may execute asymmetrically, asynchronously, batch, concurrently, delayed, dynamically, in parallel, on-demand, periodically, real-time, symmetrically, simultaneously, synchronously, triggered, and/or the like are contemplated by the disclosure (e.g., see Distributed E2EEHWKR, above, for examples). Consequently, some of these features may be mutually contradictory, in that they cannot be simultaneously present in a single embodiment. Similarly, some features may be applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations-in-part, divisions, provisionals, re-issues, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a E2EEHWKR individual and/or enterprise user, component, database configuration and/or relational model, data type, data transmission and/or network framework, feature, library, syntax structure, and/or the like, various embodiments of the E2EEHWKR, may be implemented that allow a great deal of flexibility and customization. While various embodiments and discussions of the E2EEHWKR have included encryption key recovery, however, it is to be understood that the embodiments described herein may be readily configured and/or customized for a wide variety of other applications and/or implementations. For example, aspects of the E2EEHWKR also may be adapted for data backup and recovery, backups, and/or the like.

What is claimed is:

1. A fracturable user security PIN based crypto wallet backup apparatus, comprising:
 at least one memory;
 a component collection stored in the at least one memory;
 any of at least one processor disposed in communication with the at least one memory, the any of at least one processor executing processor-executable instructions from the component collection, storage of the component collection structured with processor-executable instructions comprising:
  obtain, via the any of at least one processor, a key backup request datastructure, in which the key backup request datastructure is structured as specifying a wallet private key, a private key backup server identifier, a PIN shard fracture scheme definition, and a plurality of PIN shard backup devices;
  obtain, via the any of at least one processor, a user security PIN;
  encrypt, via the any of at least one processor, the wallet private key utilizing the user security PIN;
  determine, via the any of at least one processor, a public key associated with the private key backup server identifier;
  calculate, via the any of at least one processor, a symmetric key from the public key associated with the private key backup server identifier and an app private key;
  encrypt, via the any of at least one processor, the encrypted wallet private key utilizing the symmetric key;
  send, via the any of at least one processor, the twice encrypted wallet private key to a private key backup server corresponding to the private key backup server identifier;
  generate, via the any of at least one processor, an asymmetric keypair;
  encrypt, via the any of at least one processor, the user security PIN utilizing a public key of the asymmetric keypair;
  generate, via the any of at least one processor, a number of encrypted user security PIN shards from the encrypted user security PIN using a secret sharing method, in which the number of encrypted user security PIN shards to generate is specified via the PIN shard fracture scheme definition; and
  send, via the any of at least one processor, each of the generated encrypted user security PIN shards to a corresponding PIN shard backup device from the plurality of PIN shard backup devices.

2. The apparatus of claim 1, in which the PIN shard fracture scheme definition is structured as specifying an M of N fracture scheme.

3. The apparatus of claim 2, in which N specifies the number of encrypted user security PIN shards to generate and M specifies how many encrypted user security PIN shards are sufficient to constitute the encrypted user security PIN.

4. The apparatus of claim 1, in which a PIN shard backup device is one of: a cloud, a mobile device, a cold storage device, a hardware security module, a backup server, a trusted contact.

5. The apparatus of claim 1, in which the user security PIN is obtained from a user via a user security PIN interaction interface mechanism.

6. The apparatus of claim 1, in which the private key backup server is structured to be unable to decrypt the encrypted wallet private key.

7. The apparatus of claim 6, in which the private key backup server is structured not to have access to the user security PIN.

8. The apparatus of claim 1, in which the symmetric key is calculated via Diffie-Hellman Key-Exchange.

9. The apparatus of claim 1, in which the user security PIN is encrypted via an API call to an encryption library implementing a security protocol.

10. The apparatus of claim 1, in which the asymmetric keypair is an RSA keypair.

11. The apparatus of claim 1, in which the secret sharing method is Shamir's secret sharing.

12. The apparatus of claim 1, in which the storage of the component collection is further structured with processor-executable instructions comprising:
  obtain, via the any of at least one processor, a key recovery request datastructure associated with the wallet private key, in which the key recovery request datastructure is structured as specifying a subset of the plurality of PIN shard backup devices;
  obtain, via the any of at least one processor, the twice encrypted wallet private key from the private key backup server corresponding to the private key backup server identifier;
  decrypt, via the any of at least one processor, the twice encrypted wallet private key utilizing the symmetric key to determine the encrypted wallet private key;
  obtain, via the any of at least one processor, a number of encrypted user security PIN shards sufficient to constitute the encrypted user security PIN from the subset of the plurality of PIN shard backup devices;
  constitute, via the any of at least one processor, the encrypted user security PIN from the obtained encrypted user security PIN shards using the secret sharing method;
  decrypt, via the any of at least one processor, the encrypted user security PIN utilizing a private key of the asymmetric keypair to determine the user security PIN; and
  decrypt, via the any of at least one processor, the encrypted wallet private key utilizing the user security PIN to recover the wallet private key.

13. The apparatus of claim 12, in which the storage of the component collection is further structured with processor-executable instructions comprising:
  provide, via the any of at least one processor, the recovered wallet private key to a requestor.

14. The apparatus of claim 12, in which the storage of the component collection is further structured with processor-executable instructions comprising:
  generate, via the any of at least one processor, a user security PIN interaction interface mechanism; and obtain, via the any of at least one processor, an updated user security PIN from a user via the user security PIN interaction interface mechanism.

15. The apparatus of claim 14, in which the storage of the component collection is further structured with processor-executable instructions comprising:

generate, via the any of at least one processor, an updated key backup request datastructure, in which the updated key backup request datastructure is structured as specifying the recovered wallet private key, the private key backup server identifier, the PIN shard fracture scheme definition, the plurality of PIN shard backup devices, and the updated user security PIN.

16. A fracturable user security PIN based crypto wallet backup processor-readable, non-transient medium, the medium storing a component collection, storage of the component collection structured with processor-executable instructions comprising:

obtain, via the any of at least one processor, a key backup request datastructure, in which the key backup request datastructure is structured as specifying a wallet private key, a private key backup server identifier, a PIN shard fracture scheme definition, and a plurality of PIN shard backup devices;

obtain, via the any of at least one processor, a user security PIN;

encrypt, via the any of at least one processor, the wallet private key utilizing the user security PIN;

determine, via the any of at least one processor, a public key associated with the private key backup server identifier;

calculate, via the any of at least one processor, a symmetric key from the public key associated with the private key backup server identifier and an app private key;

encrypt, via the any of at least one processor, the encrypted wallet private key utilizing the symmetric key;

send, via the any of at least one processor, the twice encrypted wallet private key to a private key backup server corresponding to the private key backup server identifier;

generate, via the any of at least one processor, an asymmetric keypair;

encrypt, via the any of at least one processor, the user security PIN utilizing a public key of the asymmetric keypair;

generate, via the any of at least one processor, a number of encrypted user security PIN shards from the encrypted user security PIN using a secret sharing method, in which the number of encrypted user security PIN shards to generate is specified via the PIN shard fracture scheme definition; and send, via the any of at least one processor, each of the generated encrypted user security PIN shards to a corresponding PIN shard backup device from the plurality of PIN shard backup devices.

17. A fracturable user security PIN based crypto wallet backup processor-implemented system, comprising:

means to store a component collection;

means to process processor-executable instructions from the component collection, storage of the component collection structured with processor-executable instructions comprising:

obtain, via the any of at least one processor, a key backup request datastructure, in which the key backup request datastructure is structured as specifying a wallet private key, a private key backup server identifier, a PIN shard fracture scheme definition, and a plurality of PIN shard backup devices;

obtain, via the any of at least one processor, a user security PIN;

encrypt, via the any of at least one processor, the wallet private key utilizing the user security PIN;

determine, via the any of at least one processor, a public key associated with the private key backup server identifier;

calculate, via the any of at least one processor, a symmetric key from the public key associated with the private key backup server identifier and an app private key;

encrypt, via the any of at least one processor, the encrypted wallet private key utilizing the symmetric key;

send, via the any of at least one processor, the twice encrypted wallet private key to a private key backup server corresponding to the private key backup server identifier;

generate, via the any of at least one processor, an asymmetric keypair;

encrypt, via the any of at least one processor, the user security PIN utilizing a public key of the asymmetric keypair;

generate, via the any of at least one processor, a number of encrypted user security PIN shards from the encrypted user security PIN using a secret sharing method, in which the number of encrypted user security PIN shards to generate is specified via the PIN shard fracture scheme definition; and send, via the any of at least one processor, each of the generated encrypted user security PIN shards to a corresponding PIN shard backup device from the plurality of PIN shard backup devices.

18. A fracturable user security PIN based crypto wallet backup processor-implemented process, including processing processor-executable instructions via any of at least one processor from a component collection stored in at least one memory, storage of the component collection structured with processor-executable instructions comprising:

obtain, via the any of at least one processor, a key backup request datastructure, in which the key backup request datastructure is structured as specifying a wallet private key, a private key backup server identifier, a PIN shard fracture scheme definition, and a plurality of PIN shard backup devices;

obtain, via the any of at least one processor, a user security PIN;

encrypt, via the any of at least one processor, the wallet private key utilizing the user security PIN;

determine, via the any of at least one processor, a public key associated with the private key backup server identifier;

calculate, via the any of at least one processor, a symmetric key from the public key associated with the private key backup server identifier and an app private key;

encrypt, via the any of at least one processor, the encrypted wallet private key utilizing the symmetric key;

send, via the any of at least one processor, the twice encrypted wallet private key to a private key backup server corresponding to the private key backup server identifier;

generate, via the any of at least one processor, an asymmetric keypair;

encrypt, via the any of at least one processor, the user security PIN utilizing a public key of the asymmetric keypair;

generate, via the any of at least one processor, a number of encrypted user security PIN shards from the encrypted user security PIN using a secret sharing method, in which the number of encrypted user security PIN shards to generate is specified via the PIN shard fracture scheme definition; and send, via the any of at least one processor, each of the generated encrypted user security PIN shards to a corresponding PIN shard backup device from the plurality of PIN shard backup devices.

* * * * *